United States Patent
Zamarripa et al.

(10) Patent No.: US 10,249,275 B2
(45) Date of Patent: Apr. 2, 2019

(54) HANDPAN HANGER

(71) Applicants: Adam Zamarripa, Marina Del Rey, CA (US); Amanda Kosarin, Marina Del Rey, CA (US)

(72) Inventors: Adam Zamarripa, Marina Del Rey, CA (US); Amanda Kosarin, Marina Del Rey, CA (US)

( * ) Notice: Subject to any disclaimer, the term of this patent is extended or adjusted under 35 U.S.C. 154(b) by 169 days.

(21) Appl. No.: 15/055,494

(22) Filed: Feb. 26, 2016

(65) Prior Publication Data
US 2016/0253984 A1   Sep. 1, 2016

Related U.S. Application Data

(60) Provisional application No. 62/121,503, filed on Feb. 27, 2015.

(51) Int. Cl.
| | |
|---|---|
| A47B 23/00 | (2006.01) |
| G10G 5/00 | (2006.01) |
| F16B 2/24 | (2006.01) |
| G10D 13/02 | (2006.01) |

(52) U.S. Cl.
CPC ............ *G10G 5/00* (2013.01); *F16B 2/24* (2013.01); *G10D 13/026* (2013.01)

(58) Field of Classification Search
CPC ............ A47G 25/0614; A47G 25/0621; A47G 25/0628; A47G 25/0635; A47G 25/0642; A47G 25/065; A47K 10/10; A47K 10/12
USPC .... 248/692, 489, 497, 443, 447.1, 301, 304, 248/306, 314, 339; 984/257; 84/327; 211/119.004, 106.01
See application file for complete search history.

(56) References Cited

U.S. PATENT DOCUMENTS

| | | | | |
|---|---|---|---|---|
| 632,234 | A * | 9/1899 | Burgess | A47G 25/06 211/32 |
| 1,133,209 | A * | 3/1915 | Wolke | A47G 1/16 248/215 |
| 1,674,305 | A * | 6/1928 | Sedlock | G10G 5/00 248/126 |
| 2,506,119 | A * | 5/1950 | Tregear | A47J 47/16 248/200 |

(Continued)

*Primary Examiner* — Terrell L McKinnon
*Assistant Examiner* — Michael McDuffie
(74) *Attorney, Agent, or Firm* — Eric Kelly

(57) ABSTRACT

In some embodiments, a hanger may removably mount a handpan to a wall. The hanger may comprise at least one elongate member, which may comprise a substrate-mounting-region disposed from a handpan-engagement-region. The substrate-mounting-region may mount to the wall so that the hanger may be mounted to the wall. The handpan-engagement-region may removably engage at least some portion of a cavity of the handpan. When the hanger may be mounted to the wall, the handpan-engagement-region may removably support the handpan so the handpan may be removably coupled to the wall. A length of the at least one elongate member may be of sufficient length to removably engage the cavity, but too long to pose dangers to passerbys. And a critical angle may not be too narrow, reducing the length and increasing a probability of the handpan falling; nor may the critical angle be too wide, providing an increased danger to passerbys.

16 Claims, 32 Drawing Sheets

(56) References Cited

U.S. PATENT DOCUMENTS

| | | | | |
|---|---|---|---|---|
| 3,016,224 | A * | 1/1962 | Hall | F16B 47/003 24/3.12 |
| 3,044,630 | A * | 7/1962 | Szabo | A47G 25/0621 16/223 |
| 3,195,846 | A | 7/1965 | Dahlhauser | |
| 3,423,058 | A * | 1/1969 | Kuster | A47G 25/0607 211/87.01 |
| 3,536,287 | A * | 10/1970 | Hyman | A47G 25/0614 248/215 |
| 3,677,415 | A | 7/1972 | Radek | |
| 3,707,742 | A * | 1/1973 | Justice | A45C 13/023 206/38.1 |
| 4,088,292 | A * | 5/1978 | Emminger | A47G 25/0607 248/205.1 |
| 4,182,505 | A | 1/1980 | Cobin | |
| D255,213 | S | 6/1980 | Fischer | |
| D255,646 | S | 7/1980 | Fischer | |
| D257,945 | S | 1/1981 | Fischer | |
| D257,946 | S | 1/1981 | Fischer | |
| 4,684,099 | A * | 8/1987 | Krapf | A47B 97/04 248/447.1 |
| 4,721,212 | A * | 1/1988 | Lowe | A47G 25/0685 16/223 |
| 4,726,554 | A * | 2/1988 | Sorrell | A47F 5/0846 211/106.01 |
| D306,110 | S | 2/1990 | Thompson | |
| D312,385 | S | 11/1990 | Hamann | |
| 5,346,168 | A | 9/1994 | Astrella | |
| 5,967,344 | A * | 10/1999 | Liberati | A47G 25/06 211/32 |
| 5,967,476 | A | 10/1999 | Chen | |
| D418,351 | S | 1/2000 | Lee | |
| D422,892 | S | 4/2000 | Donovan | |
| 6,050,427 | A * | 4/2000 | Loveland | E05D 11/00 211/119.004 |
| 6,091,008 | A | 7/2000 | Yu | |
| 6,204,440 | B1 | 3/2001 | Yu | |
| 6,231,018 | B1 | 5/2001 | Barbieri | |
| D463,971 | S | 10/2002 | Lillelund | |
| 6,464,189 | B1 | 10/2002 | Yu | |
| D473,125 | S | 4/2003 | Conroy | |
| D473,451 | S | 4/2003 | Goodman | |
| D485,157 | S | 1/2004 | Rodrigue | |
| D490,694 | S | 6/2004 | Levine-Umans | |
| 6,758,455 | B2 | 7/2004 | Weck | |
| D497,306 | S | 10/2004 | Anderson | |
| D499,329 | S | 12/2004 | Suero | |
| D531,012 | S | 10/2006 | Shih | |
| D542,631 | S | 5/2007 | Munson et al. | |
| 7,252,274 | B1 * | 8/2007 | Brannen | A47J 45/02 248/301 |
| 7,259,310 | B2 | 8/2007 | Wilfer | |
| D551,542 | S | 9/2007 | Gallien | |
| D553,481 | S | 10/2007 | Kubota | |
| D556,025 | S | 11/2007 | Kubota | |
| 7,395,998 | B2 * | 7/2008 | Peterson | A47G 1/20 248/218.2 |
| 7,464,910 | B1 * | 12/2008 | St. Germain | G10G 5/00 211/85.6 |
| 7,726,619 | B2 | 6/2010 | Lien | |
| 7,780,129 | B1 * | 8/2010 | Cundy | A47B 96/067 248/231.91 |
| 8,251,342 | B1 * | 8/2012 | Weiner | A63C 17/0006 211/106.01 |
| 8,286,928 | B2 | 10/2012 | Lien | |
| 8,308,116 | B2 * | 11/2012 | Daniels | A47G 25/0678 211/106.01 |
| 8,448,268 | B2 * | 5/2013 | Bradshaw | E04H 4/14 211/100 |
| D695,092 | S | 12/2013 | Krumpe | |
| D695,093 | S | 12/2013 | Hammer | |
| D703,028 | S | 4/2014 | Hammer | |
| D712,725 | S | 9/2014 | Wu | |
| 8,844,886 | B2 | 9/2014 | Mejia | |
| D714,621 | S | 10/2014 | Pan | |
| D714,622 | S | 10/2014 | Pan | |
| D715,133 | S | 10/2014 | Pan | |
| D715,625 | S | 10/2014 | Pan | |
| D715,626 | S | 10/2014 | Pan | |
| D716,133 | S | 10/2014 | Pan | |
| D716,134 | S | 10/2014 | Pan | |
| 9,211,023 | B1 * | 12/2015 | Weiss | A47G 25/0614 |
| 9,869,424 | B1 * | 1/2018 | Forrest | A47H 1/022 |
| 2003/0155475 | A1 * | 8/2003 | Hicks | B60C 25/00 248/301 |
| 2003/0189144 | A1 * | 10/2003 | Byrne | A47G 7/045 248/226.11 |
| 2007/0194202 | A1 * | 8/2007 | Lamotta | A47G 1/20 248/475.1 |
| 2012/0181244 | A1 * | 7/2012 | Wang | A47G 25/06 211/106.01 |

* cited by examiner

HANDPAN HANGER

PRIORITY NOTICE

The present application claims priority under 35 U.S.C. § 119(e) to U.S. Provisional Patent Application Ser. No. 62/121,503 filed on Feb. 27, 2015, the disclosure of which is incorporated herein by reference in its entirety.

TECHNICAL FIELD OF THE INVENTION

The present invention relates to devices, apparatuses, systems and/or methods for mounting (removably so in some embodiments), including removable hanging, of handpan musical instruments to a substrate, such as a wall, for storage and/or ornamental display purposes of the handpan musical instrument upon the substrate.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

As musical instruments, handpans may be in of an idiophone class of instruments. Idiophone instruments may be any musical instrument that may create sound primarily by the musical instrument as a whole vibrating, without use of strings or membranes.

A handpan may comprise an upper hemisphere and a lower hemisphere in integral communication with the upper hemisphere. The Upper hemisphere may be referred to as a "ding side." The ding side may comprise a center note area, and a plurality of surrounding note areas (often elliptical). A boundary, e.g., a dividing rim, may divide the upper hemisphere from the lower hemisphere.

The lower hemisphere may be known as the "gu side." This gu side may comprise at least one bass cavity, hereinafter, a cavity. The cavity may comprise a cavity diameter. The cavity diameter, in various handpans, may vary from about 7 centimeters (cm) to about 9 cm. The cavity may comprise at least one externally accessible opening. The cavity may generally be cylindrical in shape, with side walls and closed at a distal end opposite of the at least one externally accessible opening. A depth of the cavity, in various handpans, may vary from about 18 cm to about 22 cm. The depth of the cavity, in various handpans, may vary from about 15.5 cm to about 26 cm. This depth of the cavity may extend into a volume partially circumscribed by the upper hemisphere.

The handpan may comprise a total outside diameter, as measured from one side of the dividing rim to an opposing side of the dividing rim. In some handpans, this total outside diameter may be about 52 cm. In some handpans, this total outside diameter may be about 48 cm to about 60 cm. A total height, as measured from the lower hemisphere to a farthest point of the upper hemisphere, may be greater than the depth of the cavity. In various handpans, this total height may be about 24 cm to about 26 cm. In various handpans, this total height may be about 16 cm to about 29 cm.

In terms of mass, various handpans may be about 5.44 kg (i.e., 12 pounds [lbs] in weight). In terms of mass, various handpans may be about 3.18 kg (7 lbs) to about 7.26 kg (16 lbs).

Handpan musical instruments may also be known as: "hand pan," HANG, HALO, BELLS, GUBAL, sound sculpture, and the like; and with various styles, dimensions, and design generations from sources such as PanArt, Pantheon Steel, BellArt, and the like.

Currently such handpans may be stored by users in a traveling bag, such as a luggage piece configured to house one or more handpans. However, there is currently no hanging nor mounting means for removably mounting the handpan to a substrate such as a wall. It would be desirable to removably mount the handpan to the substrate, for a storage purpose and/or for an ornamental display purpose, as removably mounting the handpan to the substrate may present a natural beauty of the handpan, much in the way a three dimensional sculpture might be displayed upon a wall.

Existing hooks and hangers have been attempted to be used for this removable substrate mounting purpose and found undesirable at best or a plain failure as more often the case. Existing art of hooks and hangers have several problems.

First, many existing hooks and/or hangers are structurally configured to removably hold garments, such as jackets or hats. Such existing hooks and/or hangers do not extend far enough into the handpan cavity to provide a reliable mounting means, that is, the handpan either falls off of the existing hook and/or the existing hanger; or easily falls off the existing hook and/or the existing hanger. The reason such existing garment hooks and/or hangers do not extend sufficiently into the handpan cavity, is because a length of the existing garment hook and/or hanger arm is too short; and an angle of divergence (as measured from the arm of the existing hook or the existing hanger to the substrate) is too narrow, often being less than 50 degrees.

Second, such existing hooks and/or such existing hangers generally comprise a transverse width that is so small (too narrow) as not to provide any side-to-side stability when the handpan cavity may be removably mounted or attempted to be removably mounted to the existing hook and/or the existing hanger. That is, because of the narrowness of the existing hook and/or the existing hanger, the handpan is easily knocked off of the existing hook and/or the existing hanger. This may damage the handpan and may also provide a dangerous and undesirable condition wherein the foreseeable and probable fall may injure someone, other property, and/or animals.

Third, such existing hooks and/or such existing hangers are not made to continually sustain constant static loads of about 12 pounds (lbs) (or about 7 to 16 lbs for other handpans), a typical weight of handpans, and over a short time such existing hooks and/or hangers fail by breaking, fail by coming detached from the substrate, and/or bending or deforming out of shape to where the handpan may not be removably mounted to the existing hook and/or the existing hanger. For example, some such existing hooks and/or existing hangers have been tested and failed by snapping at about 6 months of use.

Some existing hooks and/or existing hangers, e.g., those in use with various shelving systems, may have a sufficient arm length to removably engage a sufficient portion of the handpan cavity, but this class of existing hooks and/or hangers has at least two other problems. One, when such existing hook and/or hanger is not in use, this sufficient arm length often presents a danger to those passing nearby because the arm length is too long. And two, the angle of divergence of this sufficient arm length from the substrate is too wide, often around 90 degrees or more than 70 degrees, which contributes to problem of the arm protruding too far from the substrate. These existing longer shelving arms also suffer the problem with the existing garment hooks and/or the existing hangers of being too narrow in transverse width such that handpan is too wobbly when mounted on the too long and narrow shelving arm, easily falling off. Further, because of these existing longer shelving arms being too long and too minimal in transverse width, the handpan tends to hang with the upper hemisphere ding side facing more towards the ground and not parallel (or not close to parallel) with the substrate (e.g., wall), which detracts from displaying the natural beauty of the handpan.

There is a need in the art for a means to removably mount the handpan to the substrate, i.e., a need for a specifically structured hanger for removably mounting of the handpan to the substrate or within a proximity of the substrate, wherein the arm length is not too short, nor too long, and the angle of divergence, a critical angle, may not be too wide, nor too narrow.

It is to these ends that the present invention has been developed.

BRIEF SUMMARY OF THE INVENTION

To minimize the limitations in the prior art, and to minimize other limitations that will be apparent upon reading and understanding the present specification, the present invention describes hangers, landing strips, systems of at least the hanger, and/or methods of using the hanger.

In some embodiments, a hanger may removably mount a handpan to a substrate, such as a wall. In some embodiments, the hanger may comprise at least one elongate member, which may comprise a substrate-mounting-region disposed from a handpan-engagement-region. In some embodiments, the substrate-mounting-region may mount to the substrate so that the hanger may be mounted to the substrate. In some embodiments, the handpan-engagement-region may removably engage a cavity of the handpan. When the hanger may be mounted to the substrate, the handpan-engagement-region may removably support the handpan so the handpan may be removably mounted in proximity to the substrate. A length of the at least one elongate member may be of sufficient length to removably engage the cavity, but too long to pose dangers to passerbys when the hanger may not be in use, but still mounted to the substrate. And a critical angle may not be too narrow, reducing the length and increasing a probability of the handpan falling from the hanger; nor may the critical angle be too wide, providing an increased danger to passerbys when the hanger may not be in use, but still mounted to the substrate. In some embodiments, the hanger may comprise a transverse-width that may be larger than at least some existing hangers and at least some existing hooks, but still less than a cavity diameter of the cavity, wherein such a transverse-width may minimize wobbliness of the handpan upon the hanger.

It is an objective of the present invention to provide a hanger for removably mounting a handpan to a substrate or within proximity of the substrate.

It is another objective of the present invention to provide the hanger for removably mounting the handpan to the substrate or within proximity of the substrate, in manner which may be reliable and/or safe, such that falls of the handpan off of the hanger may be minimized.

It is another objective of the present invention to provide the hanger for removably mounting the handpan to the substrate or within proximity of the substrate, such that the handpan is not too wobbly upon the hanger.

It is another objective of the present invention to provide the hanger for removably mounting the handpan to the substrate or within proximity of the substrate, in manner that protects the handpan from impacts and/or scratches from the hanger.

It is another objective of the present invention to provide the hanger and/or a landing strip for removably mounting the handpan to the substrate or within proximity of the substrate, in manner that protects the substrate from impacts and/or scratches from the handpan.

It is another objective of the present invention to provide the hanger for removably mounting the handpan to the substrate or within proximity of the substrate, such that the handpan hangs by gravity upon at least some portion of the hanger.

It is yet another objective of the present invention to provide the hanger for removably mounting the handpan to the substrate or within proximity of the substrate, such that the handpan removably mounts by frictional gripping between the hanger and the handpan.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
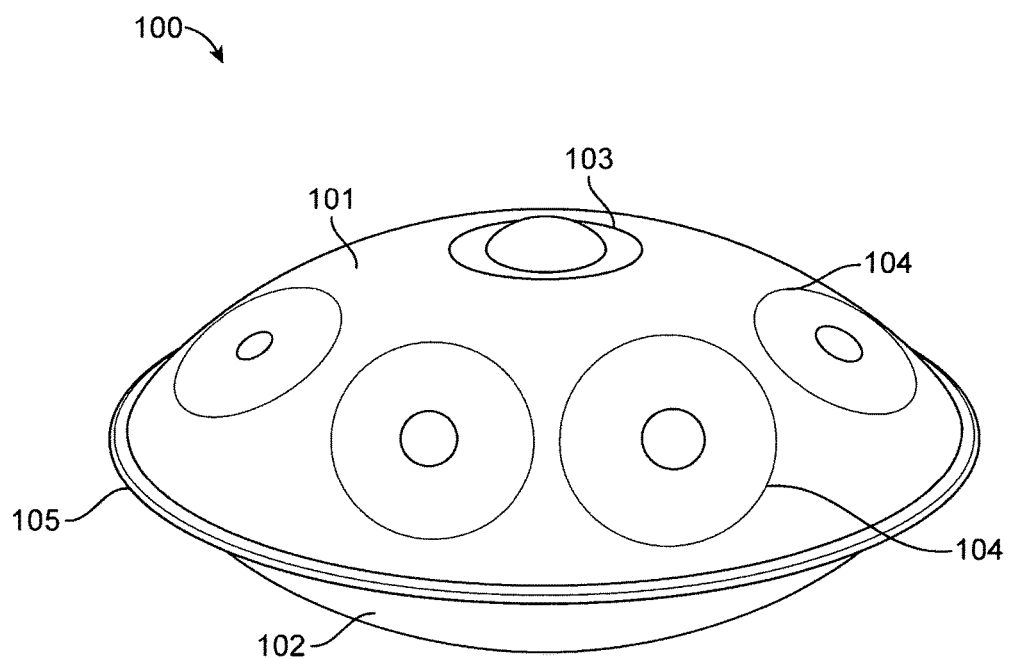
FIG. 1A may depict a musical instrument, a handpan, prior art, shown from a top perspective view.

REFERENCE NUMERAL SCHEDULE 100 handpan 100 (prior art)
101 upper hemisphere 101
102 lower hemisphere 102
103 center note area 103
104 surrounding note areas 104
105 dividing rim 105
106 handpan-plane 106
110 cavity 110 (e.g., bass cavity 110)
111 cavity diameter 111
112 at least one externally accessible opening 112 (opening 112)
113 top cavity wall 113
114 cavity side walls 114 (e.g., side walls 114)
120 total outside diameter 120
125 total height 125
207 angle-off-from-parallel 207
300 hanger 300
301 at least one elongate member 301
302 substrate-mounting-region 302
303 handpan-engagement-region 303
304 first-bend 304
305 second-bend 305
306 hypotenuse-region 306
307 at least one mounting hole 307 (e.g., hole 307)
308 transverse-width 308
309 thickness 309
311 substrate contacting surface 311
312 external surface 312
313 upper substrate facing surface 313
314 externally facing surface 314
315 terminal point 315
401 critical angle 401
404 first-bend angle 404
405 second-bend angle 405
410 orthogonal distance 410
601 covering 601

708 transverse-width 708
717 cylindrical head structure 717
750 hanger 750
751 third-bend 751
752 first-span 752
753 second-span 753
754 fourth-bend 754
780 hanger 780
781 radial spiral 781
782 at least one outside diameter 782
800 landing strip 800
801 cutout 801
900 landing strip 900
902 raised edge 902
903 disk-outside-diameter 903
907 mounting hole 907
1001 substrate 1001 (e.g., a wall)

DETAILED DESCRIPTION OF THE INVENTION

Various embodiments of a hanger may be described, disclosed, and claimed herein. Such hangers may be used to removably mount (hang) a handpan to a substrate or within proximity of the substrate. This disclosure may also describe, disclose, and claim method(s) for removably mounting the handpan to the substrate or within proximity of the substrate. This disclosure may also describe, disclose, and claim system(s) for removably hanging the handpan to the substrate or within proximity of the substrate.

Note, hanging, including removable hanging, may be a sub-set of mounting, and of removable mounting.

The handpan may be prior art and the handpan may be a musical instrument in the idiophone class of musical instruments. The various embodiments of the invention described, disclosed, and claimed herein all may operate upon handpans with at least one externally accessible cavity, wherein the various embodiments may access and use this cavity for removably mounting the handpan to the substrate or within proximity of the substrate.

For example, and without limiting the scope of the present invention, the substrate may be a wall. The substrate may be substantially vertical, at least in a region wherein the hanger may be mounted (attached) to the substrate. The substrate may be substantially flat, at least in the region wherein the hanger may be mounted (attached) to the substrate.

Note, such hangers, as described and disclosed herein, may also be used to removably mount (hang) other articles to the substrate or within proximity of the substrate. For example, and without limiting the scope of the present invention, tongue drums with a cavity may also be removably mounted (hung) like the handpan upon the hanger. Tongue drums may also be known as steel tongue drums.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

A FIG. 1 series of figures may comprise FIG. 1A through FIG. 1E. The FIG. 1 series of figures may depict prior art, a musical instrument, often known as a "hand pan," "handpan," HANG, HALO, BELLS, GUBAL, sound sculpture, and the like; and with various styles, dimensions, and design generations from sources such as PanArt, Pantheon Steel, BellArt, and the like. Such prior art may be referred to herein as the "handpan." As a musical instrument, handpans may be in the idiophone class of instruments. Idiophone instruments may be any musical instrument that may create sound primarily by the musical instrument as a whole vibrating, without use of strings or membranes.

The various embodiments of the invention described, disclosed, and claimed herein all may operate upon handpans with at least one externally accessible cavity, wherein the various embodiments may access and use this cavity for removably mounting the handpan to a substrate or within proximity of the substrate. Similarly, such hangers may also operate upon tongue drums with an accessible cavity.

Figure 1B:
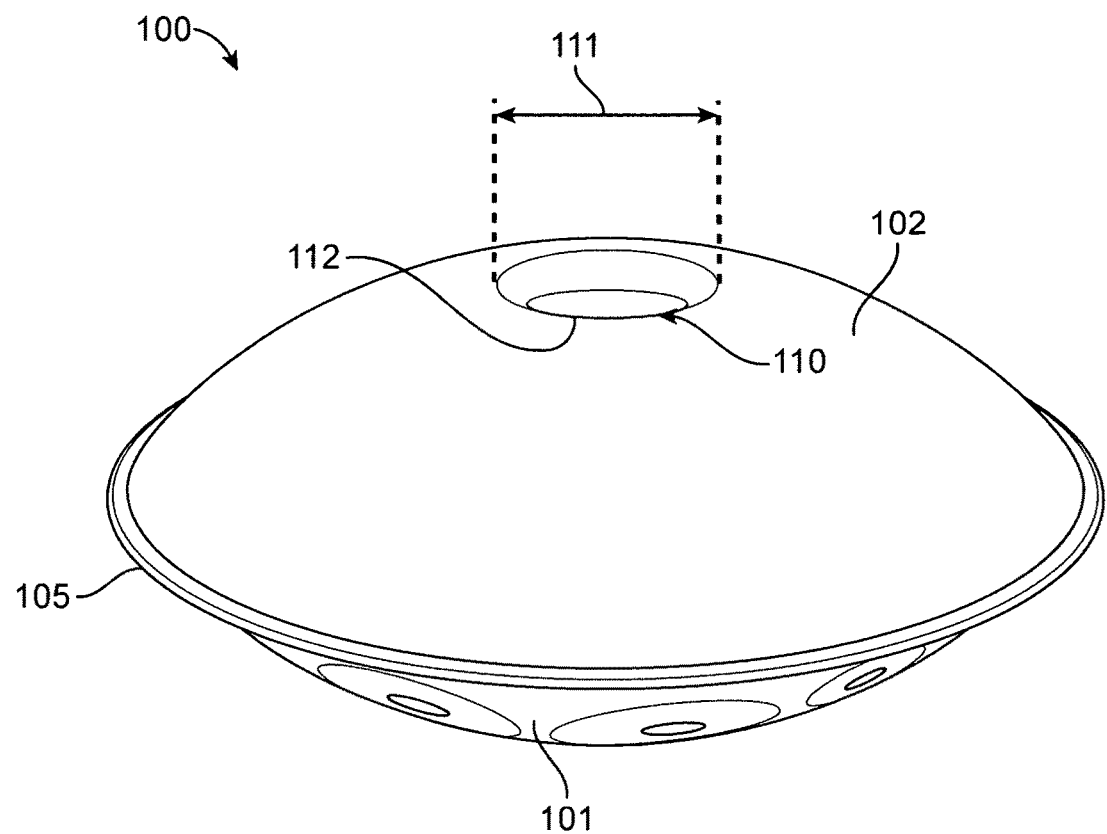
FIG. 1B may depict the handpan of FIG. 1A, but shown from a bottom perspective view.
Figure 1C:
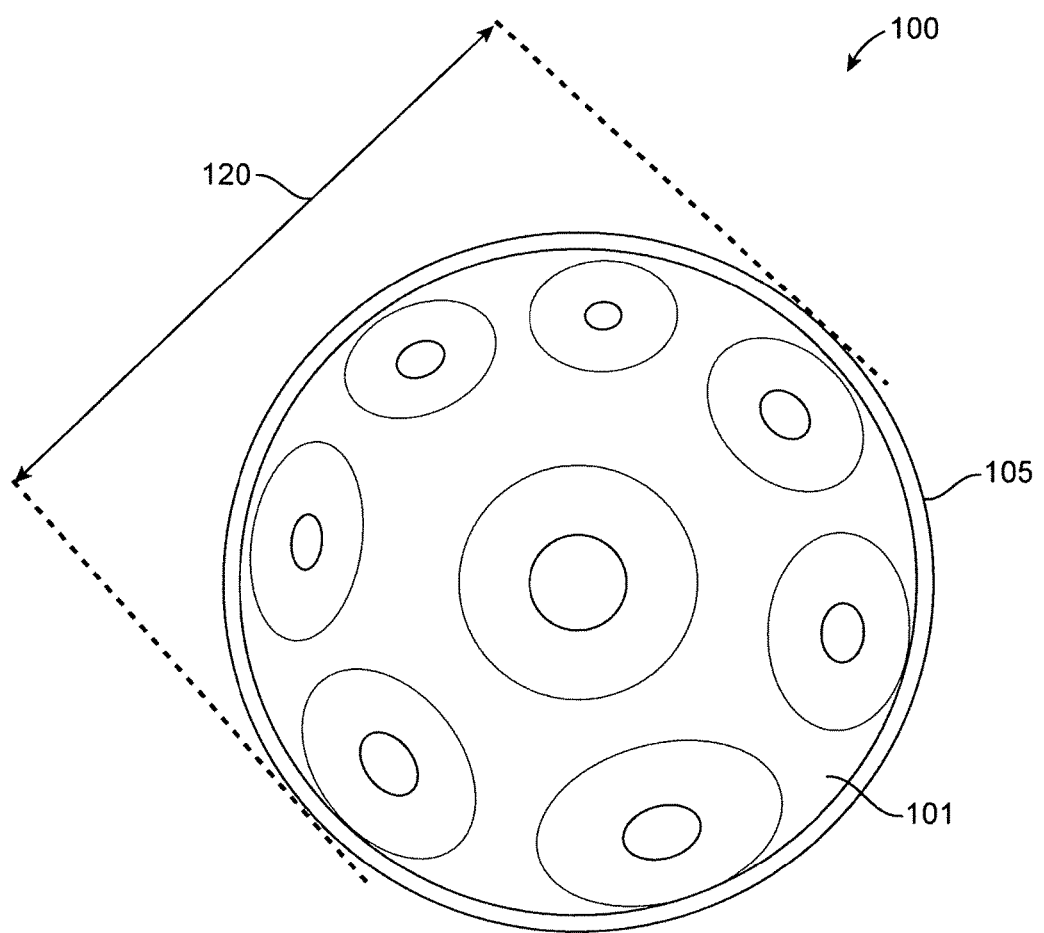
FIG. 1C may depict the handpan of FIG. 1A, but shown from a top view.
Figure 1D:
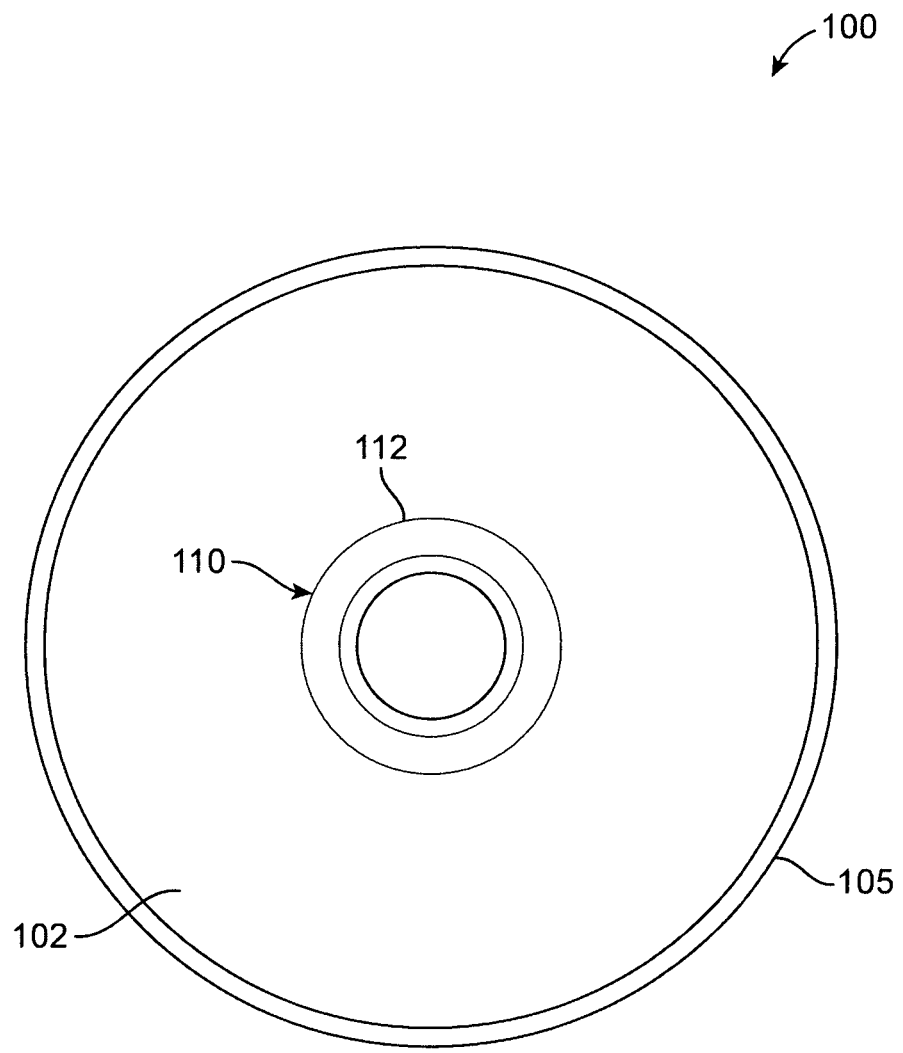
FIG. 1D may depict the handpan of FIG. 1A, but shown from a bottom view.
Figure 1E:
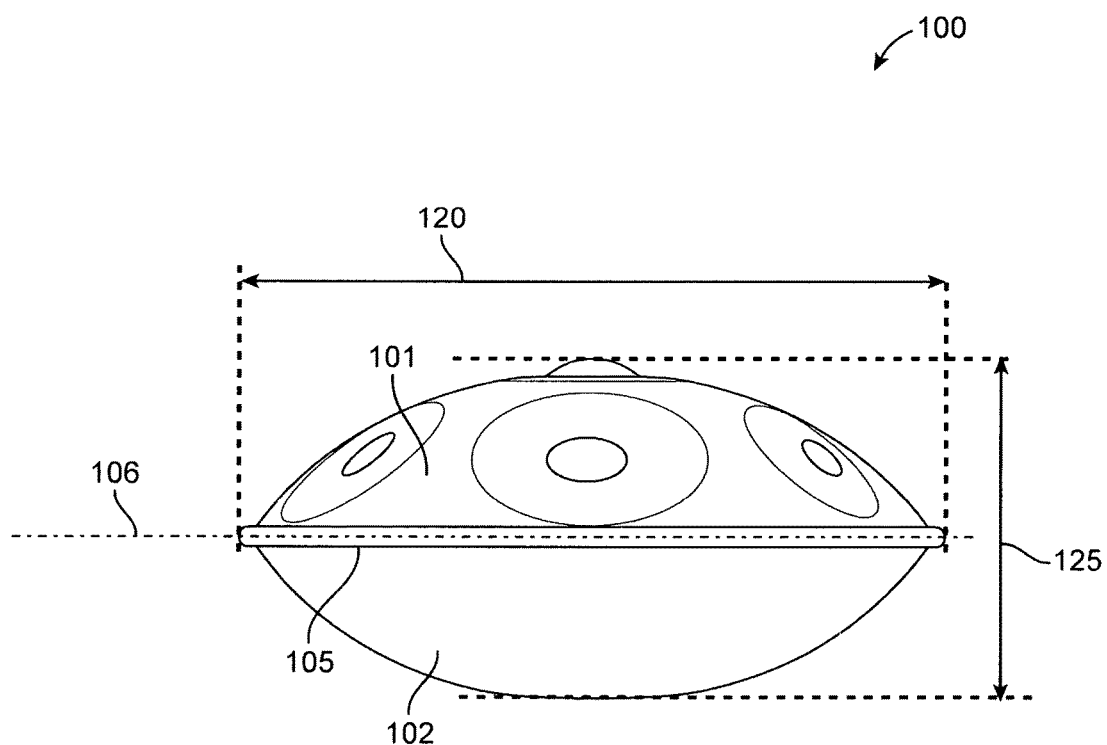
FIG. 1E may depict the handpan of FIG. 1A, but shown from a side view.

FIG. 1A may depict a handpan 100 (prior art), shown from a top perspective view. FIG. 1B may depict handpan 100, but shown from a bottom perspective view. FIG. 1C may depict handpan 100, but shown from a top view. FIG. 1D may depict handpan 100, but shown from a bottom view. FIG. 1E may depict handpan 100, but shown from a side view.

As shown in FIG. 1A (and FIG. 1E) handpan 100 may comprise an upper hemisphere 101 and a lower hemisphere 102. Upper hemisphere 101 may be referred to as the "ding side." The ding side may comprise a center note area 103, and a plurality of surrounding note areas 104 (often elliptical in appearance). A boundary, dividing rim 105, may divide upper hemisphere 101 from lower hemisphere 102. A plane dividing upper hemisphere 101 from lower hemisphere 102 along dividing rim 105 may be handpan-plane 106. See e.g., FIG. 1E (and FIG. 2A).

Lower hemisphere 102, better depicted in FIG. 1B, may be known as the "gu side." This gu side may comprise at least one bass cavity 110, herein after, cavity 110. Cavity 110 may comprise cavity diameter 111. Cavity diameter 111, in various handpans, may vary from about 7 cm to about 9 cm. Cavity 110 may comprise at least one externally accessible opening 112 (opening 112). Cavity 110 may generally be cylindrical in shape, with side walls 114 (e.g. a top cavity wall 113 shown in FIG. 5A), and closed at a distal end opposite the at least one externally accessible opening. For side walls 114 see FIG. 5B and FIG. 5C. Continuing discussing the FIG. 1 series of figures of prior art handpan 100, a depth of cavity 110, in various handpans 100, may vary from about 18 cm to about 22 cm. Depth of cavity 110, in various handpans 100, may vary from about 15.5 cm to about 26 cm. This depth of cavity 110 may extend into a volume partially circumscribed by upper hemisphere 101.

The structure and/or geometry of cavity 110 may be critical, as the various embodiments of the hanger(s) may removably mount to cavity 110, in order to mount handpan 100 to the substrate or within proximity to the substrate.

A total outside diameter 120 of handpan 100, as measured from one side of dividing rim 105 to an opposing side of dividing rim 105, may be depicted in FIG. 1C and FIG. 1E. In some handpans 100, this total outside diameter 120 may be about 52 cm. In some handpans 100, this total outside diameter 120 may be about 48 cm to about 60 cm. A total height 125, as measured from lower hemisphere 102 to a farthest point of upper hemisphere 101, may be depicted in FIG. 1E. In various handpans 100, total height 125 may be greater than the depth of cavity 110. In various handpans 100, total height 125 may be about 24 cm to about 26 cm. In various handpans 100, total height 125 may be about 16 cm to about 29 cm.

In terms of mass, various handpans 100 may be about 5.44 kg (i.e., 12 pounds [lbs.] in weight). In terms of mass, various handpans 100 may be about 3.18 kg (7 lbs.) to about 7.26 kg (16 lbs.).

A FIG. 2 series of figures, may depict handpan 100 removably mounted to a substrate 1001, by use of various embodiments of the invention, which may not be visible (depicted) in the FIG. 2 series of figures. The FIG. 2 series of figures may demonstrate purposes and functions of the various embodiments of the hangers, i.e., to provide a removable hanging means and/or a removable mounting means for removably mounting handpan 100 to substrate 1001 or within proximity of substrate 1001. While handpan 100 may be a musical instrument, upon removable mounting to substrate 1001, such mounting may serve several purposes, including, but not limited to, providing a useful function of storing handpan 100 out of the way; and secondly, by removably mounting handpan 100 to substrate 1001 or within proximity of substrate 1001, such removable mounting serves a display purpose, which may show off a natural beauty of handpan 100, as a generally hand crafted three dimensional sculpture. The FIG. 2 series of figures may comprise FIG. 2A through FIG. 2D.

Figure 2A:
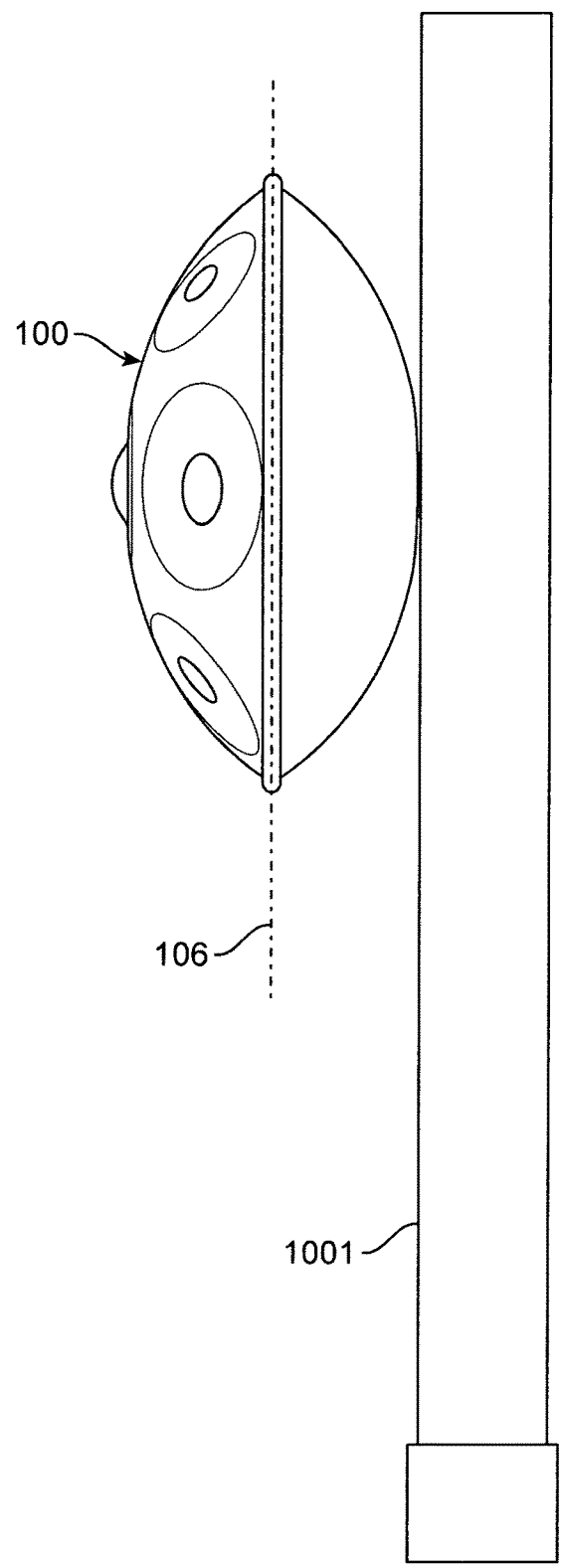
FIG. 2A may depict the handpan prior art of the FIG. 1 series, as removably hung upon a substrate (or within a proximity of the substrate), wherein the means for removable mounting (e.g., a hanger) may not be depicted, all shown from a side view.
Figure 2B:
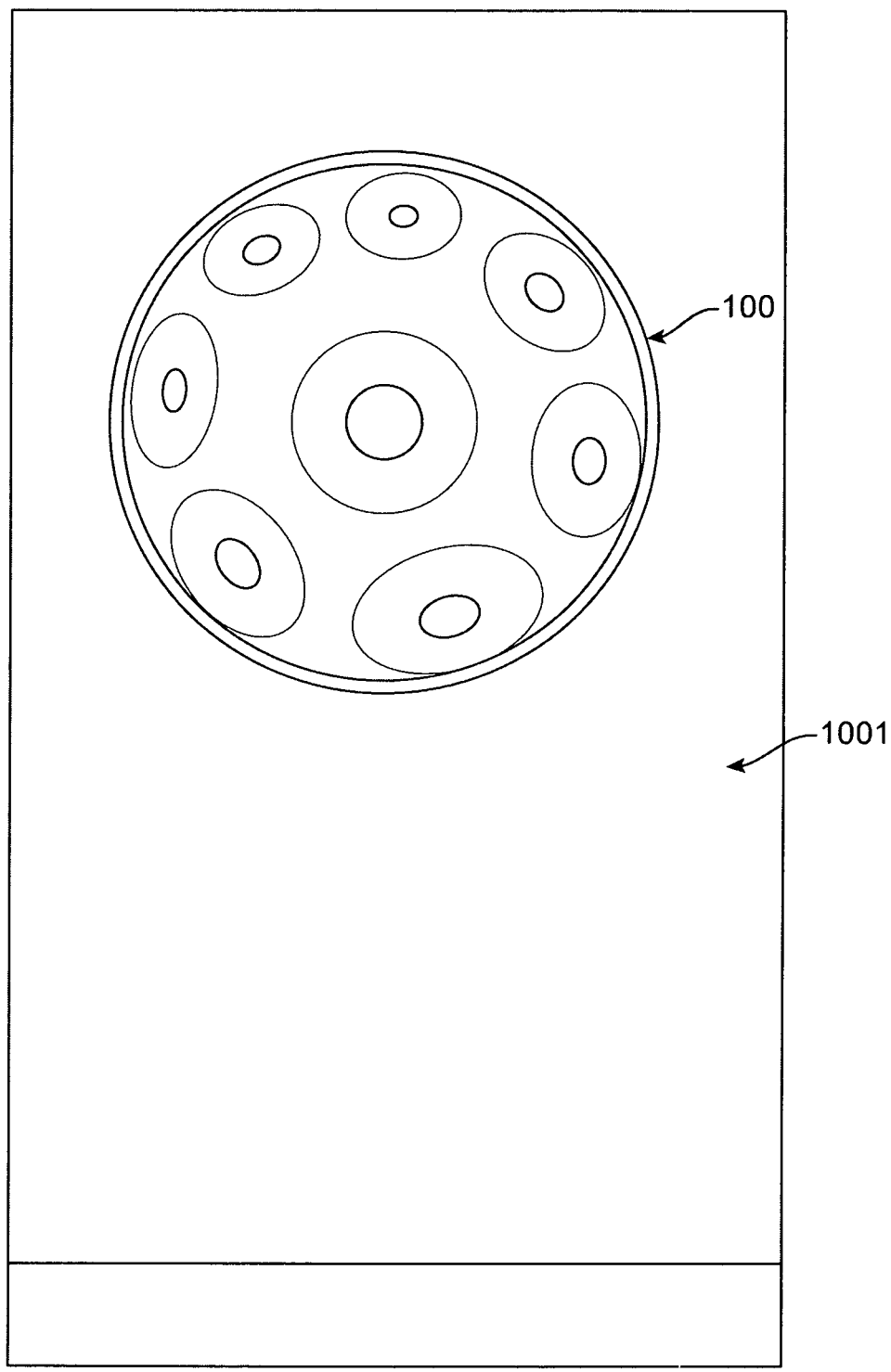
FIG. 2B may depict the handpan prior art of the FIG. 1 series, as removably hung upon the substrate (or within a proximity of the substrate), wherein the means for removable mounting (e.g., the hanger) may not be depicted, shown from a front view.

FIG. 2A may depict handpan 100 removably mounted upon substrate 1001, shown from a side view. The means for mounting (e.g., the hanger) may not be depicted in FIG. 2A. FIG. 2B may depict handpan 100 removably mounted upon substrate 1001, shown from a front view. The means for mounting (e.g., the hanger) may not be depicted in FIG. 2B.

In some embodiments, structure of the hanger may be such that when the hanger may be mounted to substrate 1001 and an handpan-engagement-region of the hanger may be removably engaging at least a portion of cavity 110 of handpan 100, such that handpan-plane 106 may be substantially parallel with a surface plane of the substrate, i.e., and an angle-off-from-parallel 207 between the handpan-plane 106 and the surface plane of the substrate may be about zero degrees. See e.g., FIG. 2A (and FIG. 5A). For angle-off-from-parallel 207 see FIG. 2C and FIG. 2D.

Figure 2C:
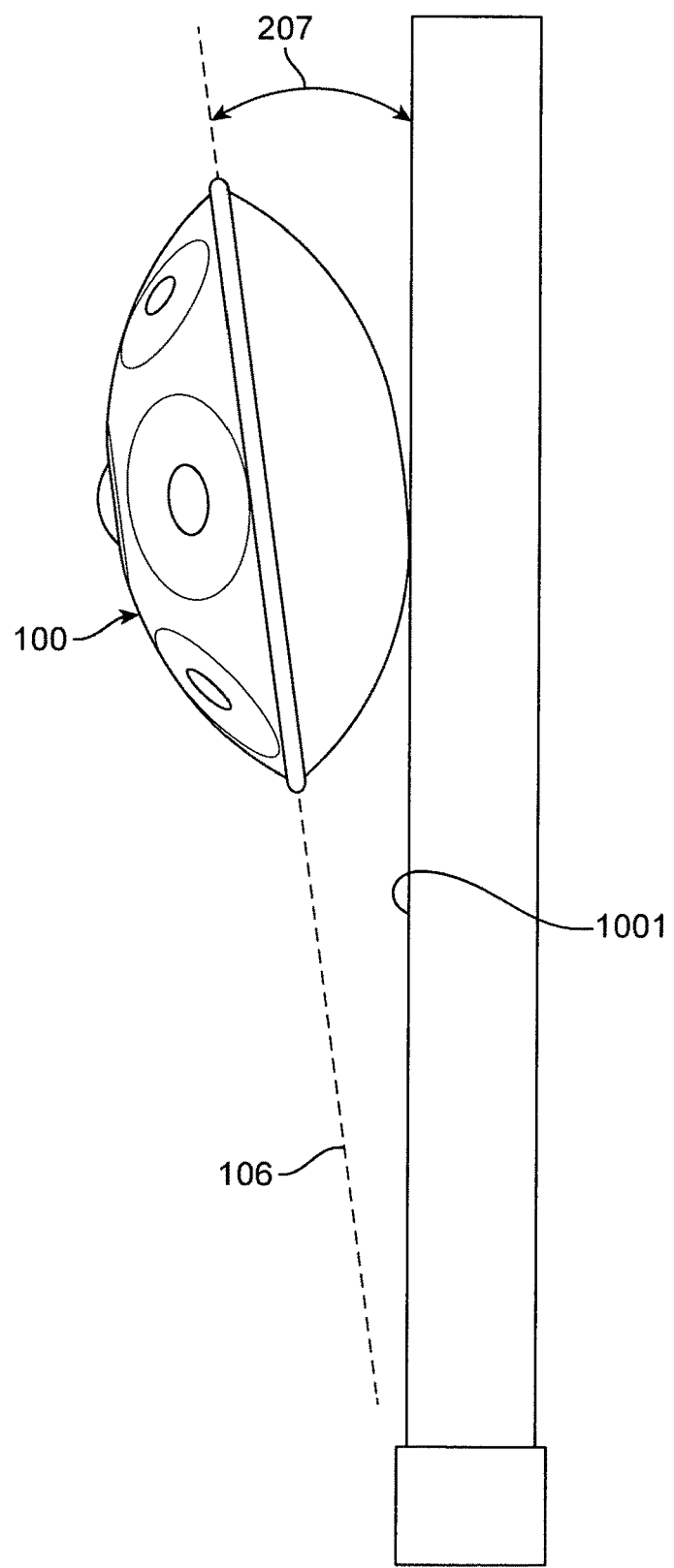
FIG. 2C may depict the handpan prior art of the FIG. 1 series, as removably hung upon a substrate (or within a proximity of the substrate), wherein the means for removable mounting (e.g., the hanger) may not be depicted, shown from a side view.
Figure 2D:
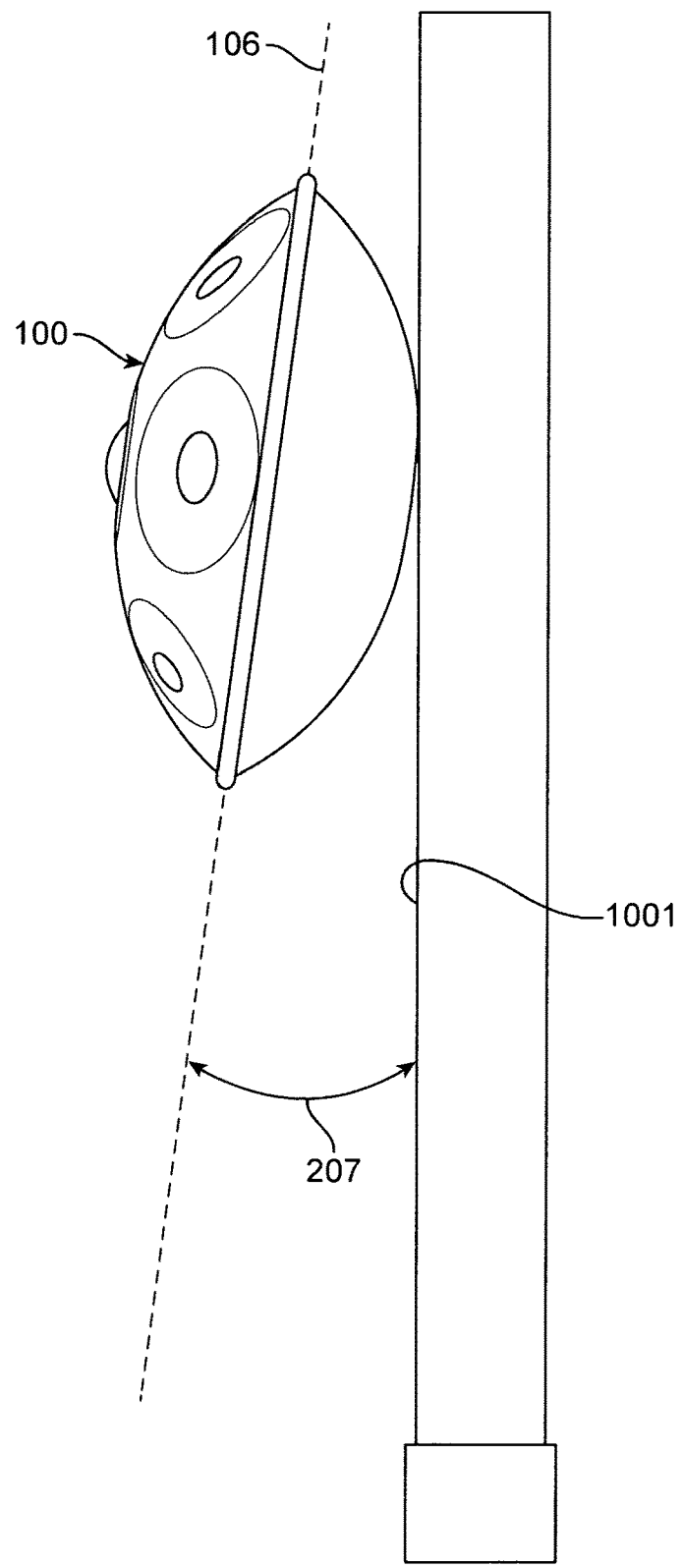
FIG. 2D may depict the handpan prior art of the FIG. 1 series, as removably hung upon a substrate (or within a proximity of the substrate), wherein the means for removable mounting (e.g., the hanger) may not be depicted, shown from a side view.

FIG. 2C may depict handpan 100 removably hung upon substrate 1001, but where angle-off-from-parallel 207 may be greater than zero degrees, shown from a side view. The means for mounting (e.g., the hanger) may not be depicted in FIG. 2C. FIG. 2D may depict handpan 100 removably hung upon substrate 1001, but where angle-off-from-parallel 207 may be greater than zero degrees, shown from a side view. The means for mounting (e.g., the hanger) may not be depicted in FIG. 2D. FIG. 2C and FIG. 2D may differ from each other, in that a tilt of angle-off-from-parallel 207 may be opposite, i.e., in FIG. 2C, a top of handpan 100 may be tilted away from substrate 1001; whereas in FIG. 2D, a bottom of handpan 100 may be tilted away from substrate 1001—where top and bottom may be with respect to a floor (not depicted), where substrate 1001 may be substantially perpendicular to such a floor.

In some embodiments the hanger structure may permit angle-off-from-parallel 207 between handpan-plane 106 and the surface plane of the substrate to be up to about 12 degrees. See e.g., FIG. 2C and FIG. 2D (see also, FIG. 5B and FIG. 5C).

Note, with respect to FIG. 2A, FIG. 2C, and FIG. 2D, the embodiments of the the hanger(s) which may permit substantially parallel removable mounting or a removable mounting with angle-off-from-parallel 207 at greater than zero degrees (e.g., up to about 12 degrees), may be different embodiments of the hangers.

A FIG. 3 series of figures may depict an exemplary embodiment of a hanger 300. In the FIG. 3 series of figures, handpan 100 may not be depicted and substrate 1001 may not be depicted. For example, hanger 300 may be the hanger used in FIG. 2A and FIG. 2B, but that is not depicted in FIG. 2A and FIG. 2B. The FIG. 3 series of figures may comprise FIG. 3A through FIG. 3F.

Figure 3A:
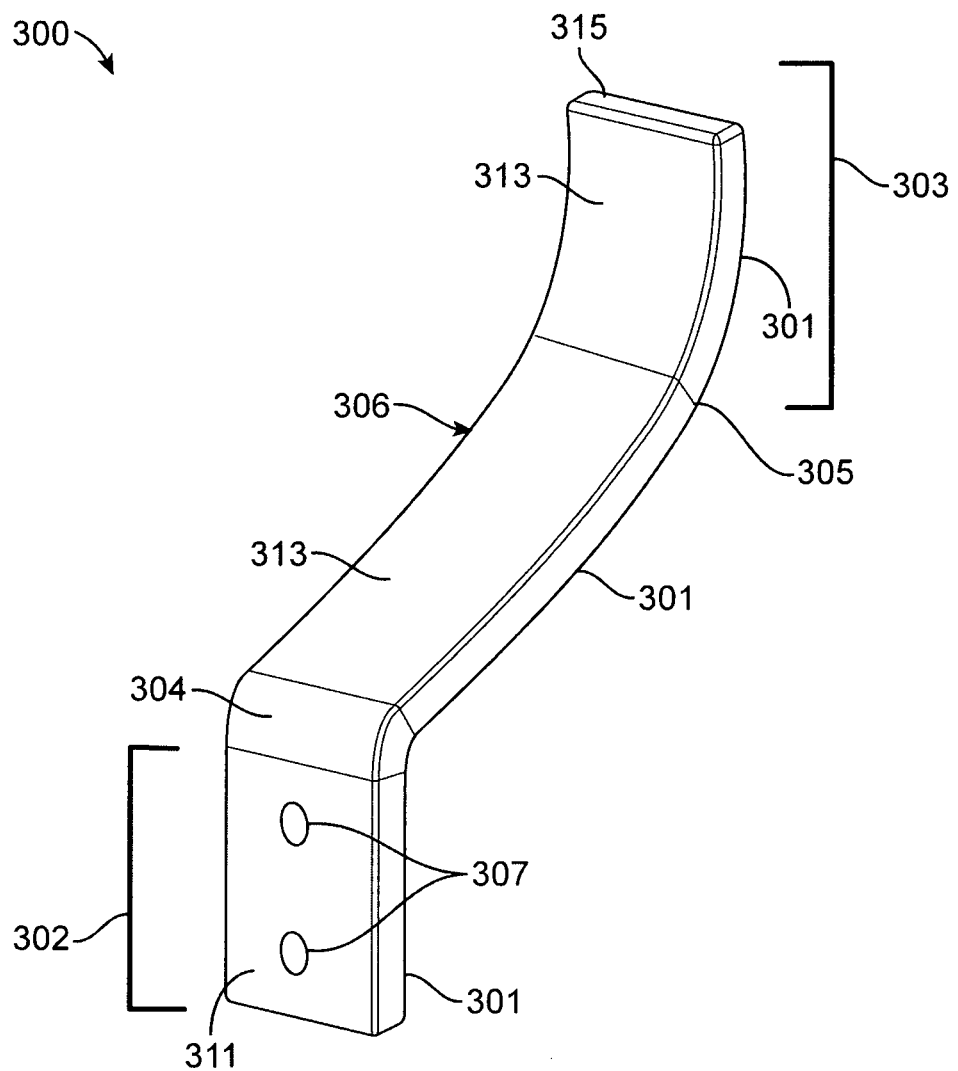
FIG. 3A may depict an exemplary embodiment of the hanger for removable mounting the handpan within proximity to the substrate, shown from a perspective view.

FIG. 3A may depict the exemplary embodiment of 300 hanger for removable mounting handpan 100 within proximity to substrate 1001, shown from a perspective view. Handpan 100 and substrate 1001 may not be depicted in FIG. 3A.

In some embodiments, hanger 300 may be for removably coupling (removably mounting) handpan 100 to substrate 1001. In some embodiments, hanger 300 may comprise at least one elongate member 301. In some embodiments, at least one elongate member 301 may be substantially rigid.

In some embodiments, at least one elongate member 301 may comprise a substrate-mounting-region 302 disposed from a handpan-engagement-region 303. In some embodiments, substrate-mounting-region 302 may be configured structurally to mount to substrate 1001 so that hanger 300 may be mounted to substrate 1001. In some embodiments, handpan-engagement-region 303 may be configured structurally to engage at least some portion of cavity 110 of handpan 100. In some embodiments, when hanger 300 may be mounted to substrate 1001, handpan-engagement-region 303 may removably support handpan 100 so handpan 100 may be removably mounted (e.g., hung) in proximity to substrate 1001. See e.g., FIG. 5A.

In some embodiments, "in proximity to the substrate" may mean at least some portion of handpan 100 may be either in removable physical contact with substrate 1001 (or a landing strip). Or at least some portion of handpan 100 may be within 4 cm of substrate 1001 (or the landing strip). See e.g., FIG. 2A, FIG. 2C, FIG. 2D, FIG. 5A, FIG. 5B, and FIG. 5C.

Figure 3B:
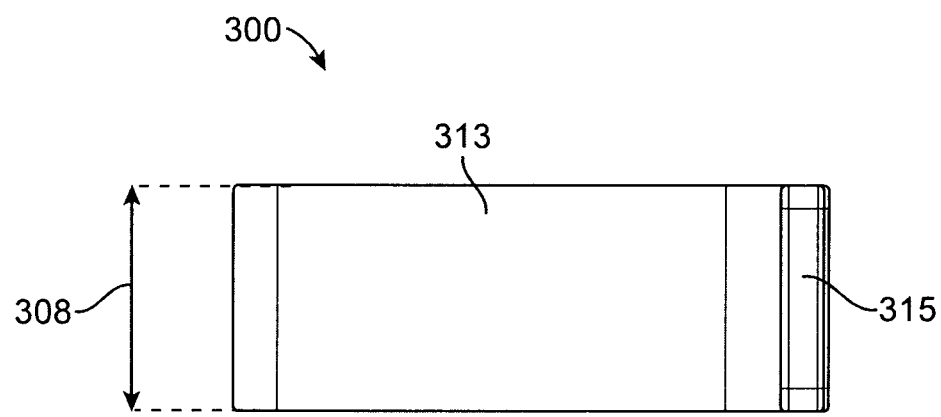
FIG. 3B may depict the exemplary embodiment of FIG. 3A, shown from a top view.
Figure 3C:
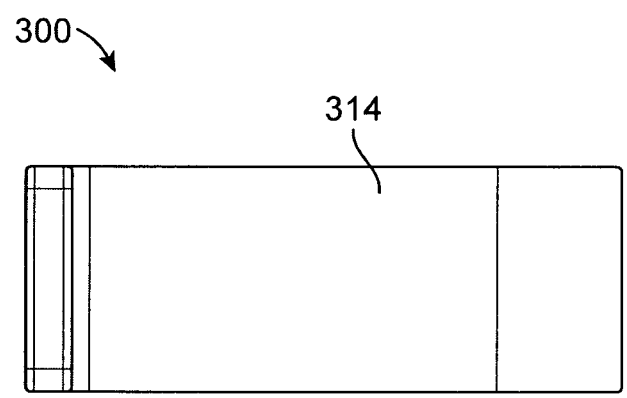
FIG. 3C may depict the exemplary embodiment of FIG. 3A, shown from a bottom view.
Figure 3D:
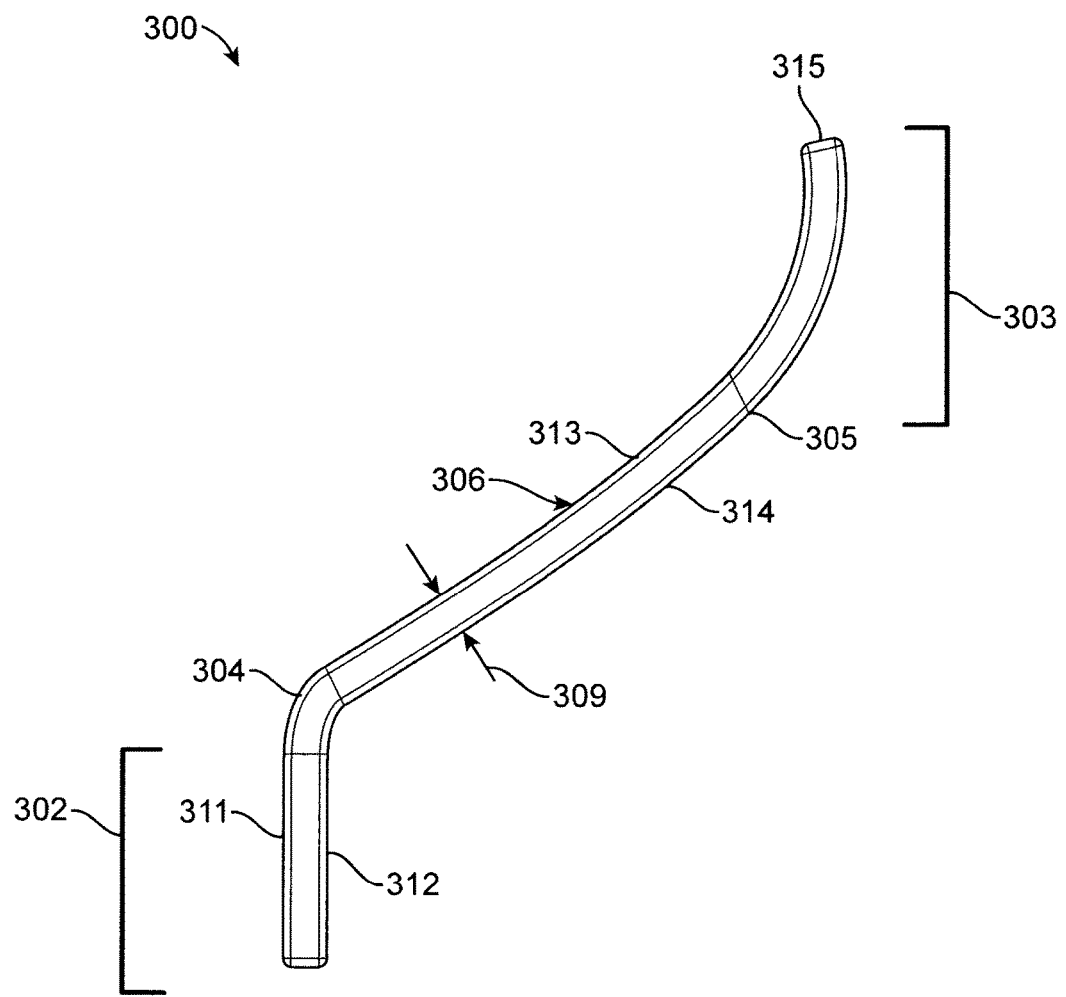
FIG. 3D may depict the exemplary embodiment of FIG. 3A, shown from a side view. (Left side and right side may be structurally equivalent.)

Continuing discussing FIG. 3A, in some embodiments, substrate-mounting-region 302 may comprise a substrate contacting surface 311 and disposed opposite an external surface 312 (not depicted in FIG. 3A, see instead FIG. 3D for external surface 312). In some embodiments, substrate contacting surface 311 may be substantially flat. In some embodiments, the substrate-mounting-region 302 may be designated as a "base" of at least one elongate member 301 or the base of hanger 300.

In some embodiments, substrate-mounting-region 302 may comprise a substrate-attachment. In some embodiments, the substrate-attachment may provide structure to mount substrate-mounting-region 302 to substrate 1001.

Continuing discussing FIG. 3A, in some embodiments, the substrate-attachment of substrate-mounting-region 302 may comprise at least one mounting hole 307. In some embodiments, at least one mounting hole 307 may run from external surface 312 to substrate contacting surface 311. In some embodiments, at least one mounting hole 307 may be sized to receive a nail, a screw, a bolt, a pin, a peg, a spike, and/or the like for mounting substrate-mounting-region 302 to substrate 1001.

In some embodiments, the substrate-attachment of substrate-mounting-region 302 may comprise a plurality of hooks or a plurality of loops located on substrate contacting surface 311; and a complimentary plurality of loops (complimentary to the plurality of hooks) or a complimentary plurality of hooks (complimentary to the plurality of loops), mounted to substrate 1001. Such a system of hooks and complimentary loops may be a VELCRO type of attachment (removable fastener) system. This substrate-attachment embodiment is not explicitly depicted in the figures.

In some embodiments, the substrate-attachment of substrate-mounting-region 302 may comprise an adhesive located on the substrate contacting surface 311. In some embodiments, such an adhesive may permit permanent (or near permanent) mounting of hanger 300 to substrate 1001. In some embodiments, such an adhesive may be a removable adhesive, permitting removable mounting of hanger 300 to substrate 1001. These adhesive substrate-attachment may not be explicitly depicted in the figures.

In some embodiments, the substrate-attachment substrate-mounting-region 302 may comprise a suction means (e.g., at least one suction cup) located on substrate contacting surface 311 for when substrate 1001 may comprise a non-porous surface and substantially flat surface, such as, but not limited to glass, plastics, and/or metals. This substrate-attachment embodiment is not explicitly depicted in the figures.

In some embodiments, at least one elongate member 301 may comprise a flat bar structure. For example, see generally, the FIG. 3 series of figures. For example, and without limiting the scope of the present invention, the flat bar may be about ⅛ inch (0.32 cm) thick by about 1 inch (2.54 cm) in transverse width (e.g., transverse-width 308 shown in FIG. 3B). In some embodiments, at least one elongate member may comprise a round bar, see e.g., FIG. 7C.

Continuing discussing FIG. 3A, in some embodiments, the flat bar structure of at least one elongate member 301 may comprise three regions: substrate-mounting-region 302, a hypotenuse-region 306, and handpan-engagement-region 303. In some embodiments, the hypotenuse-region 306 may be disposed between substrate-mounting-region 302 and handpan-engagement-region 303. In some embodiments, hypotenuse-region 306 may be substantially linear. In some embodiments, hypotenuse-region 306 may be designated as an "arm" of the at least one elongate member 301 or the arm of hanger 300. In some embodiments, hypotenuse-region 306 may be designated as at least a portion of the arm of the at least one elongate member 301 or the arm of hanger 300; wherein, that arm terminates in handpan-engagement-region 303, specifically at a terminal-point 315.

Continuing discussing FIG. 3A, in some embodiments, at least one elongate member 301 may comprise a first-bend 304. In some embodiments, first-bend 304 may be disposed between substrate-mounting-region 302 and hypotenuse-region 306. In some embodiments, first-bend 304 may link substrate-mounting-region 302 to the hypotenuse-region 306. In some embodiments of hanger 300, first-bend 304 may be fixed, i.e., not variable. In some embodiments, when hanger 300 may be mounted to substrate 1001, first-bend 304 may bend at least one elongate member 301, e.g., hypotenuse-region 306, away from substrate 1001.

Continuing discussing FIG. 3A, in some embodiments, at least one elongate member 301 may comprise a second-bend 305. In some embodiments, second-bend 305 may be disposed between hypotenuse-region 306 and handpan-engagement-region 303. In some embodiments, second-bend 305 may link hypotenuse-region 306 to handpan-engagement-region 303. In some embodiments, when hanger 300 may be mounted to substrate 1001, second-bend 305 may bend at least one elongate member 301, e.g. handpan-engagement-region 303, towards substrate 1001.

Continuing discussing FIG. 3A, in some embodiments, at least one elongate member 301 may comprise an upper substrate facing surface 313 and an externally facing surface 314 disposed opposite of upper substrate facing surface 313. Note, externally facing surface 314 may not be depicted in FIG. 3A, instead see FIG. 3C, FIG. 3D, and FIG. 3E. In some embodiments, substrate contacting surface 311 may be a sub-set of upper substrate facing surface 313. In some embodiments, external surface 312 may be a sub-set of the externally facing surface 314.

Continuing discussing FIG. 3A, in some embodiments, handpan-engagement-region 303 may removably engage at least a portion of cavity 110 of handpan 100 by providing support structure for top cavity wall 113 of handpan 100 to rest by gravity upon some portion of handpan-engagement-region 303. "Top" may be with respect to a floor associated with substrate 1001 (e.g., a wall). Top cavity wall 113 may be depicted in FIG. 5A. In some embodiments, handpan-engagement-region 303 may be designated as a "head" of hanger 300. In some embodiments, at least some portion of upper substrate facing surface 313 of handpan-engagement-region 303 may removably support some portion of top cavity wall 113 of cavity 110 of handpan 100. See e.g., FIG. 5A.

In some embodiments, handpan-engagement-region 303 may comprise a dimension greater than transverse-width 308 of the flat rod or greater than a diameter of the round rod, but less than cavity diameter 111. See e.g., FIG. 7 A.

FIG. 3B may depict the exemplary embodiment of hanger 300, shown from a top view. Handpan 100 and substrate 1001 may not be depicted in FIG. 3B. FIG. 3A may depict transverse-width 308 of hanger 300. In some embodiments, at least one elongate member 301 may comprises a transverse-width 308 and a thickness 309 (not depicted in FIG. 3B, see FIG. 3D instead for thickness 309). Transverse-width 308 may be larger than thickness 309. Transverse-width 308 may be substantially perpendicular to thickness 309. In some embodiments, at least one elongate member 301 may comprise a singular uniform transverse-width 308; e.g., as shown in the FIG. 3 series of figures. In some embodiments, transverse-width 308 may be less than cavity diameter 111, so that at least handpan-engagement-region 303 may fit removably within cavity 110. In some embodiments, handpan-engagement-region 303 may comprise its own transverse width, which may differ from transverse-width 308 of a remainder of at least one elongate member 301. In some embodiments, the transverse width (e.g., transverse-width 708, see FIG. 7A) of handpan-engagement-region 303 may be less than cavity diameter 111, so that at least handpan-engagement-region 303 may fit removably within cavity 110; but greater than transverse-width 308 of hypotenuse-region 306.

FIG. 3C may depict the exemplary embodiment of hanger 300, shown from a bottom view. Handpan 100 and substrate 1001 may not be depicted in FIG. 3C.

FIG. 3D may depict the exemplary embodiment of hanger 300, shown from a side view. Note a left side view and a right side view may be structurally equivalent for hanger 300. Handpan 100 and substrate 1001 may not be depicted in FIG. 3D. FIG. 3D may depict thickness 309 of hanger 300. Thickness 309 may run from the upper substrate facing surface 313 to externally facing surface 314.

Continuing discussing FIG. 3D, in some embodiments, handpan-engagement-region 303 may comprise terminal-point 315. Terminal-point 315 may be the structure of at least one elongate member 301 that may be the most distal from substrate-mounting-region 302.

Figure 3E:
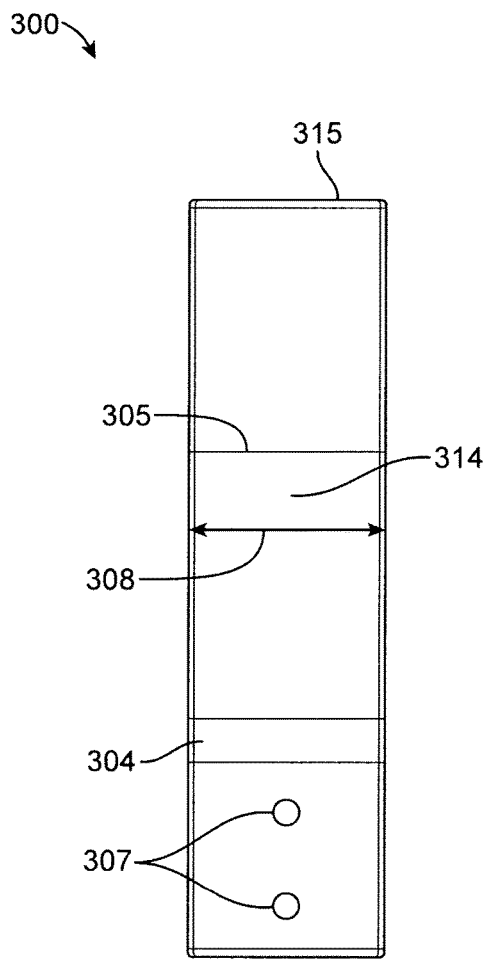
FIG. 3E may depict the exemplary embodiment of FIG. 3A, shown from a front view.

FIG. 3E may depict the exemplary embodiment of hanger 300, shown from a front view. Handpan 100 and substrate 1001 may not be depicted in FIG. 3E. FIG. 3E may depict transverse-width 308 of hanger 300.

Figure 3F:
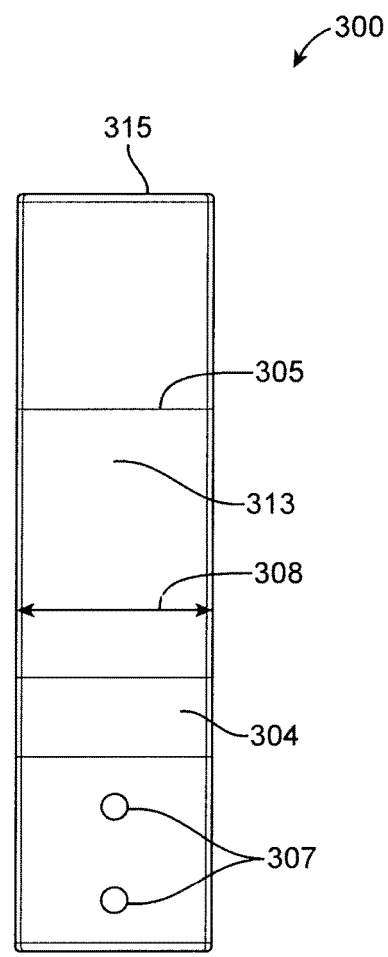
FIG. 3F may depict the exemplary embodiment of FIG. 3A, shown from a back view.

FIG. 3F may depict the exemplary embodiment of hanger 300, shown from a back view. Handpan 100 and substrate 1001 may not be depicted in FIG. 3F.

A FIG. 4 series of figures may depict hanger 300 mounted to substrate 1001 from various views and without depicting handpan 100. In some embodiments, such mounting may be permanent. In some embodiments, such mounting may be removable. The FIG. 4 series of figures may comprise FIG. 4A through FIG. 4E.

Figure 4A:
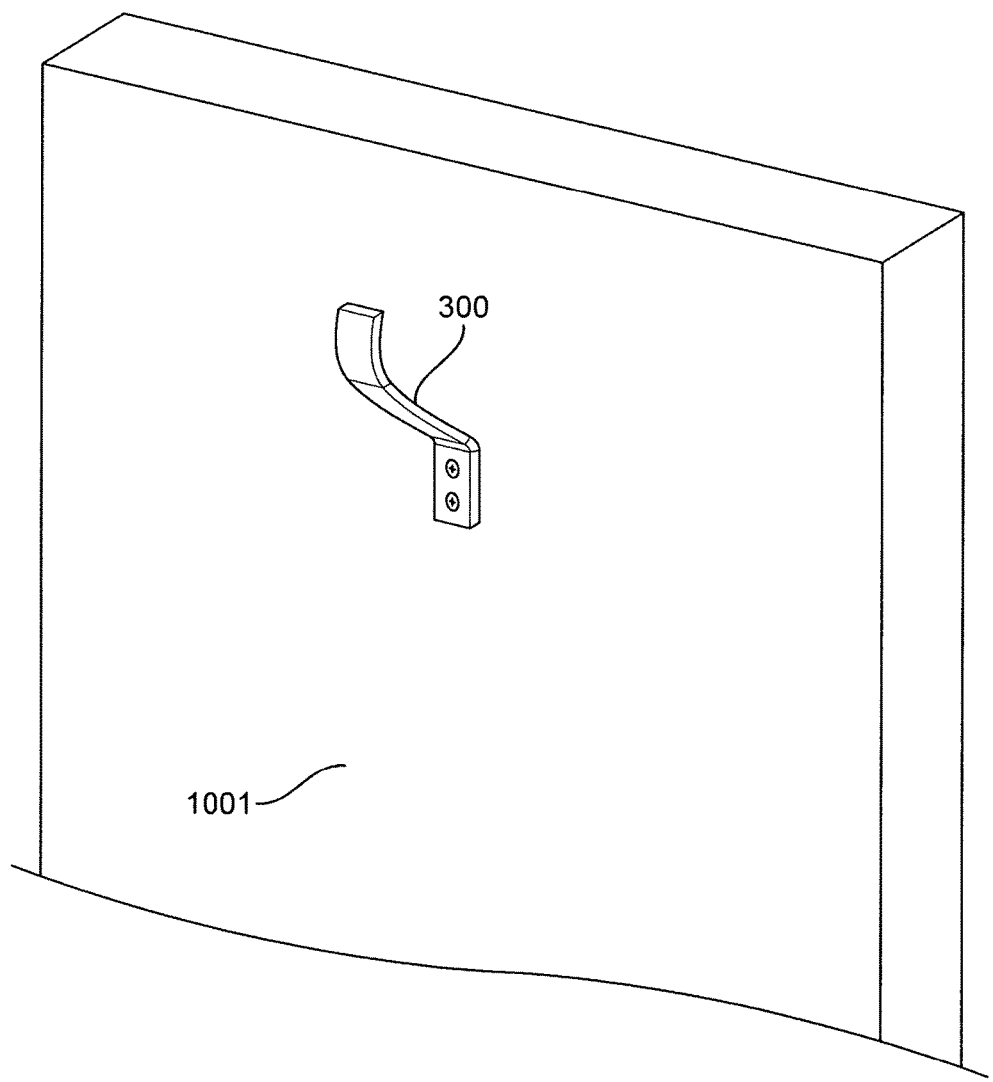
FIG. 4A may depict the exemplary embodiment of the hanger from the FIG. 3 series, but where the hanger may be mounted to the substrate, shown from a perspective view.
Figure 4B:
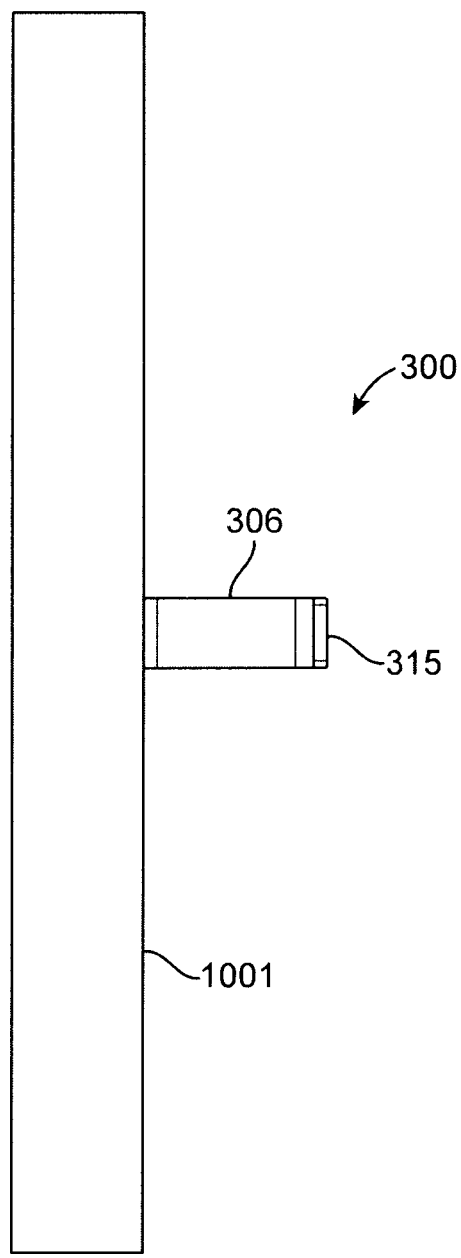
FIG. 4B may depict the exemplary embodiment of the hanger from the FIG. 3 series, but where the hanger may be mounted to the substrate, shown from a top view.
Figure 4C:
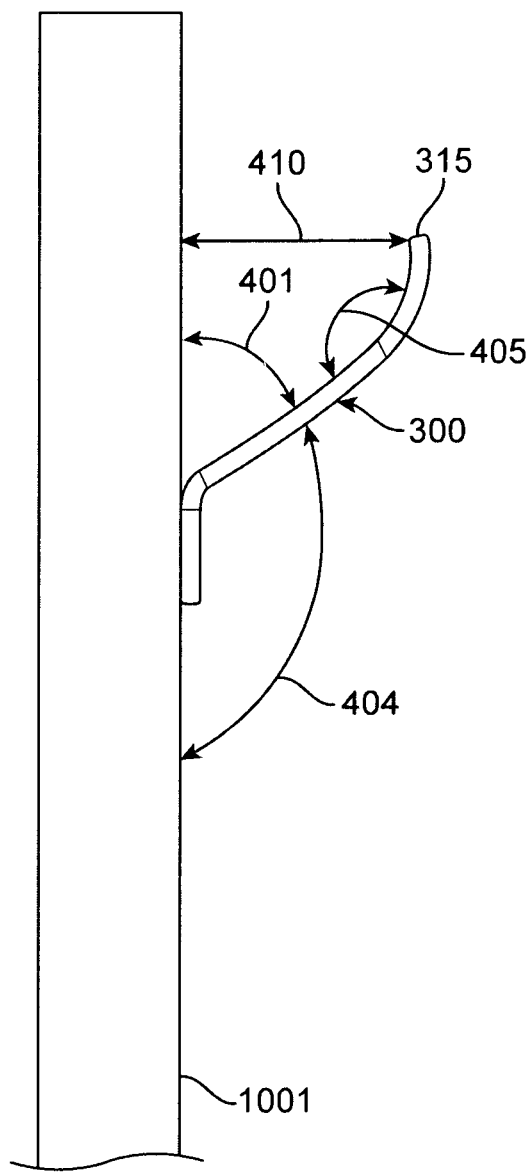
FIG. 4C may depict the exemplary embodiment of the hanger from the FIG. 3 series, but where the hanger may be mounted to the substrate, shown from a side view.

FIG. 4A may depict the exemplary embodiment of hanger 300 mounted to substrate 1001, shown from a perspective view. FIG. 4B may depict the exemplary embodiment of hanger 300 mounted to substrate 1001, shown from a top view. FIG. 4C may depict the exemplary embodiment of hanger 300 mounted to substrate 1001, shown from a side view (i.e., left or right side views).

Discussing FIG. 4C, in some embodiments, hanger 300 when mounted to substrate 1001, may comprise formation of a critical angle 401. In some embodiments, critical angle 401 may be measured from substrate 1001 to upper substrate facing surface 313 of hypotenuse-region 306. In some embodiments, a vertex of critical angle 401 may be centered in first-bend 304.

Figure 6:
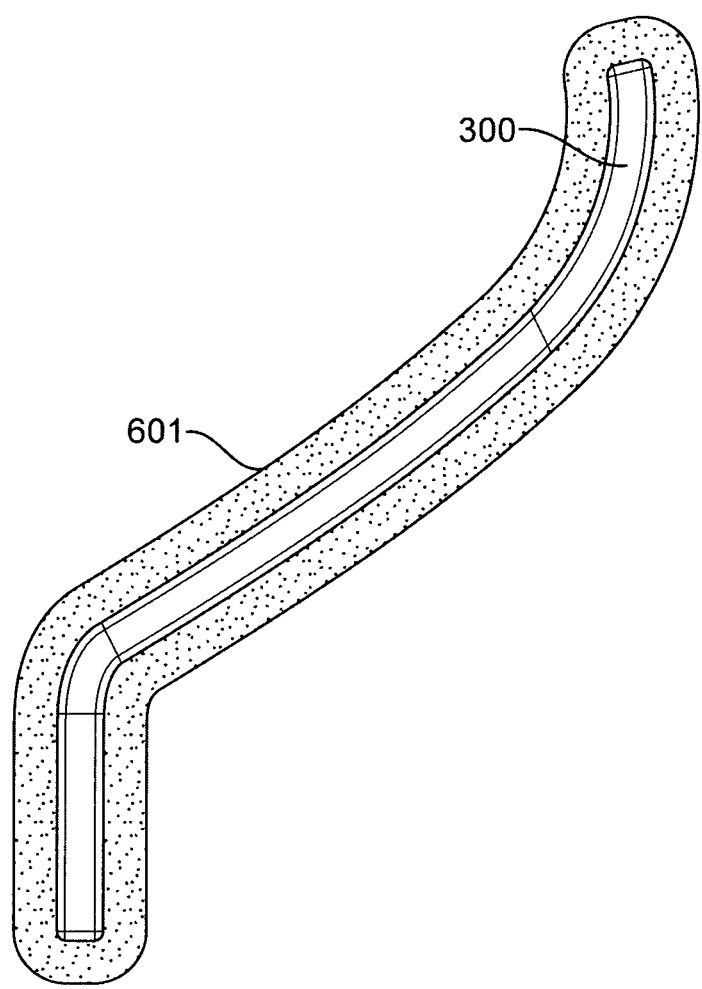
FIG. 6 may depict a side view of the hanger from the FIG. 3 series, wherein at least a portion of the hanger may be substantially covered by a covering.

In some embodiments, critical angle 401 may be in a range of about 50 degrees to about 70 degrees. In some embodiments, critical angle 401 may be about 59 degrees to about 66 degrees. In some embodiments, critical angle 401 may be about 63 degrees to about 65 degrees. In some embodiments, critical angle 401 may be about 52 degrees to about 58 degrees. In some embodiments, critical angle 401 may be about 53 degrees to about 55 degrees. Factors affecting critical angle 401 may include whether hanger 300 may have covering 601, e.g., as depicted in FIG. 6; and/or whether or not a landing pad (e.g., landing pad 900 as depicted in the FIG. 9 series of figures) may be disposed between substrate 1001 and substrate-mounting-region 302.

Continuing discussing FIG. 4C, in some embodiments, a shortest distance from terminal point 315 to substrate 1001, when hanger 300 may be mounted to substrate 1001, may be an orthogonal distance 410. In some embodiments, orthogonal distance 410 may be in a range of about 5.00 cm to about 9.00 cm. In some embodiments, orthogonal distance 410 may be in a range of about 6.30 cm to about 8.30 cm. Factor affecting orthogonal distance 410 may include whether hanger 300 may have covering 601, e.g., as depicted in FIG. 6; and/or whether or not a landing pad (e.g., landing pad 900 as depicted in the FIG. 9 series of figures) may be disposed between substrate 1001 and substrate-mounting-region 302; as well as a linear run dimension of hypotenuse-region 306. For example, and without limiting the scope of the present invention, the linear run dimension of hypotenuse-region 306 may be in a range of about 4.40 cm to about 8.00 cm.

In some embodiments, a cavity protrusion distance may approximate orthogonal distance 410, where the cavity protrusion distance may be defined as the shortest distance from substrate 1001 that terminal point 315 of handpan-engagement-region 303 may protrude into cavity 110 handpan 100 that may be removably mounted to hanger 300, when hanger 300 may be mounted to substrate 1001. In some embodiments, critical angle 401 may be defined (constrained) by a first-bend angle 404.

Continuing discussing FIG. 4C, when hanger 300 may be mounted to substrate 1001, at least one elongate member 301 may comprise a minimal length, such that terminal point 315 may be at least 5 cm from substrate 1001 (when a portion of substrate 1001 may be substantially flat). In some embodiments, this distance may be orthogonal distance 410. This minimal length of at least one elongate member 301 may be constrained (defined and/or determinable) by: (1) an angle of first-bend 304 (hereinafter, first-bend angle 404) between substrate-mounting-region 302 and externally facing surface 314 of hypotenuse-region 306; (2), a different angle of second-bend 305 between upper substrate facing surface 313 of hypotenuse-region 306 and upper substrate facing surface 313 of handpan-engagement-region 303 (hereinafter, second-bend-angle 405); and (3) the linear run dimension of hypotenuse-region 306 and a length of the handpan-engagement-region 303 running from terminal point 315 to second-bend 305. In some embodiments of hanger 300, orthogonal distance 410 of at least 5 cm (e.g., 6.50 cm or 8.26 cm) (e.g., along with critical angle 401 of about 52 degrees), may provide for a minimum protrusion distance into cavity 110 required for hanger 300 to securely support handpan 100 from falling from hanger 300, when handpan-engagement-region 303 may be removably engaging the least some portion of cavity 110 and hanger 300 may be mounted to substrate 1001.

Continuing discussing FIG. 4C, in some embodiments, first-bend 304 may be defined by first-bend angle 404. In some embodiments, first-bend angle 404 may comprise an angle as measured from external surface 312 of substrate-mounting-region 302 to externally facing surface 314 of hypotenuse-region 306. In some embodiments, first-bend angle 404 may comprise an angle as measured from substrate 1001 to externally facing surface 314 of hypotenuse-region 306. In some embodiments, first-bend angle 404 may be about 101 to 130 degrees. In some exemplary embodiments, this angle may be 103 to 128 degrees. This angle is almost (offset by thickness 309 of at least one elongate member 301, which may also include covering 601 in some embodiments) complimentary to critical angle 401, in a geometry terminology sense of "complimentary angle" wherein two such angles add to 180 degrees.

Continuing discussing FIG. 4C, in some embodiments, second-bend 305 may be defined by second-bend angle 405. In some embodiments, second-bend angle 405 may comprise an angle as measured from upper substrate facing surface 313 of handpan-engagement-region 303 to upper substrate facing surface 313 of hypotenuse-region 306, with a vertex at second-bend 305. In some embodiments, this angle may be about 30 to 70 degrees. In some embodiments, this angle may be 30 to 50 degrees.

Figure 4D:
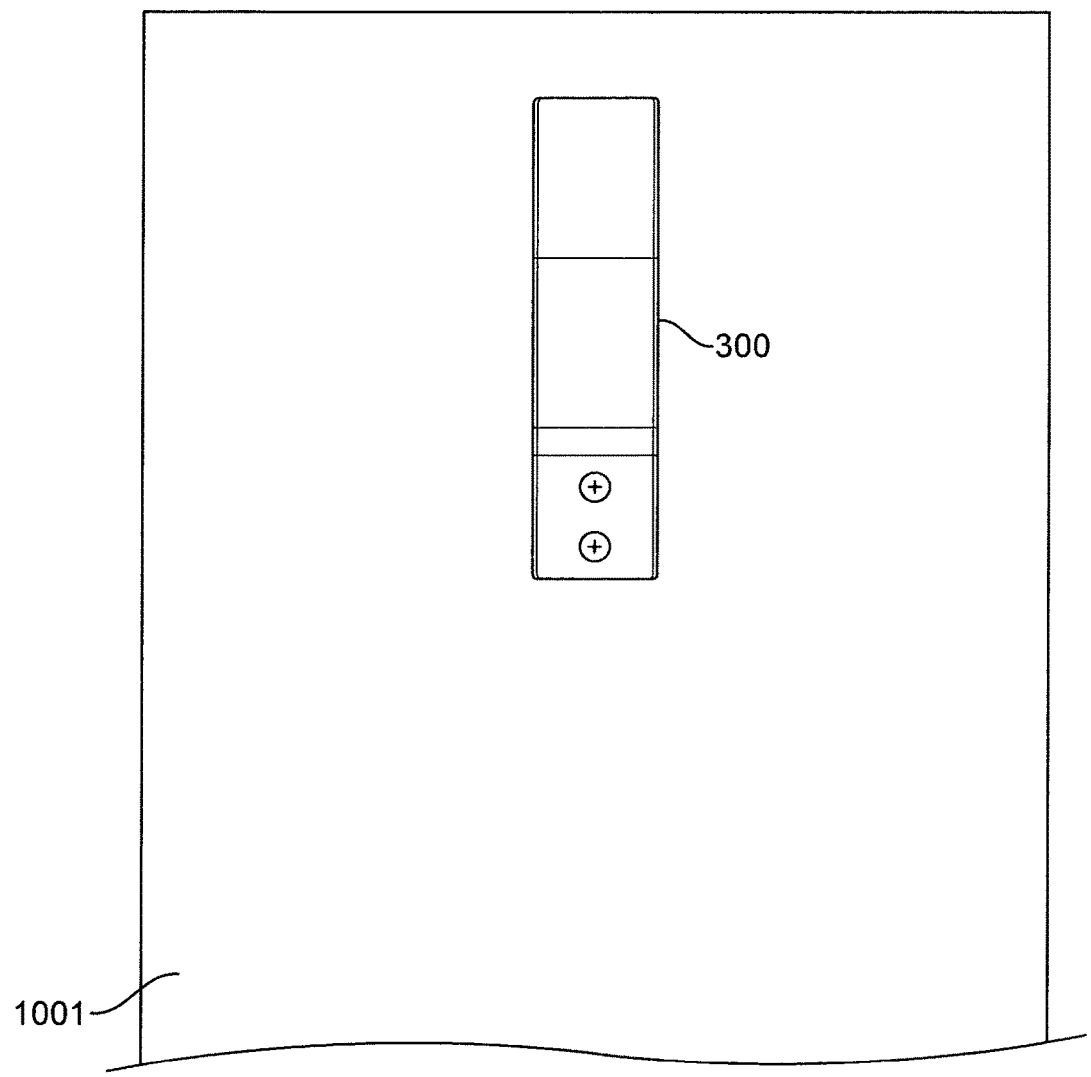
FIG. 4D may depict the exemplary embodiment of the hanger from the FIG. 3 series, but where the hanger may be mounted to the substrate, shown from a front view.
Figure 4E:
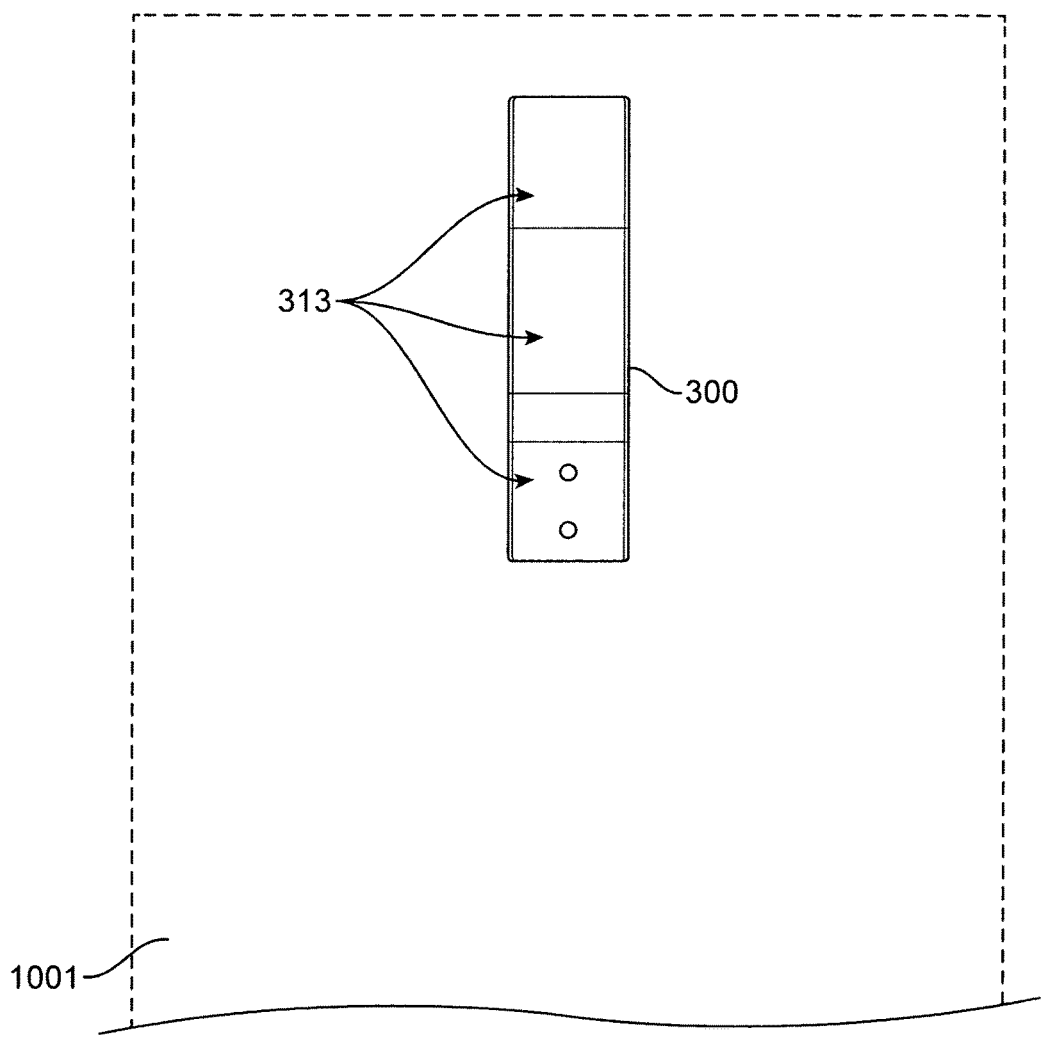
FIG. 4E may depict the exemplary embodiment of the hanger from the FIG. 3 series, but where the hanger may be mounted to the substrate, shown from a back (rear) view (with the substrate shown transparently so that the back of the hanger may be seen).

FIG. 4D may depict the exemplary embodiment of hanger 300 mounted to substrate 1001, shown from a front view. FIG. 4E may depict the exemplary embodiment of hanger 300 mounted to substrate 1001, shown from a back (rear) view (with substrate 1001 shown transparently so that the back view of hanger 300 may be visible).

A FIG. 5 series of figures may depict analogous views to FIG. 2A, FIG. 2C and FIG. 2D, but the FIG. 5 series of figures include a partial transparent view of to indicate an outline of cavity 110 within handpan 100, such that the various hangers (300, 750, 780) may be shown removably engaging at least a portion of cavity 110. In the FIG. 5 series of figures the dashed lines may indicate the outline of cavity 110 of handpan 100.

Figure 5A:
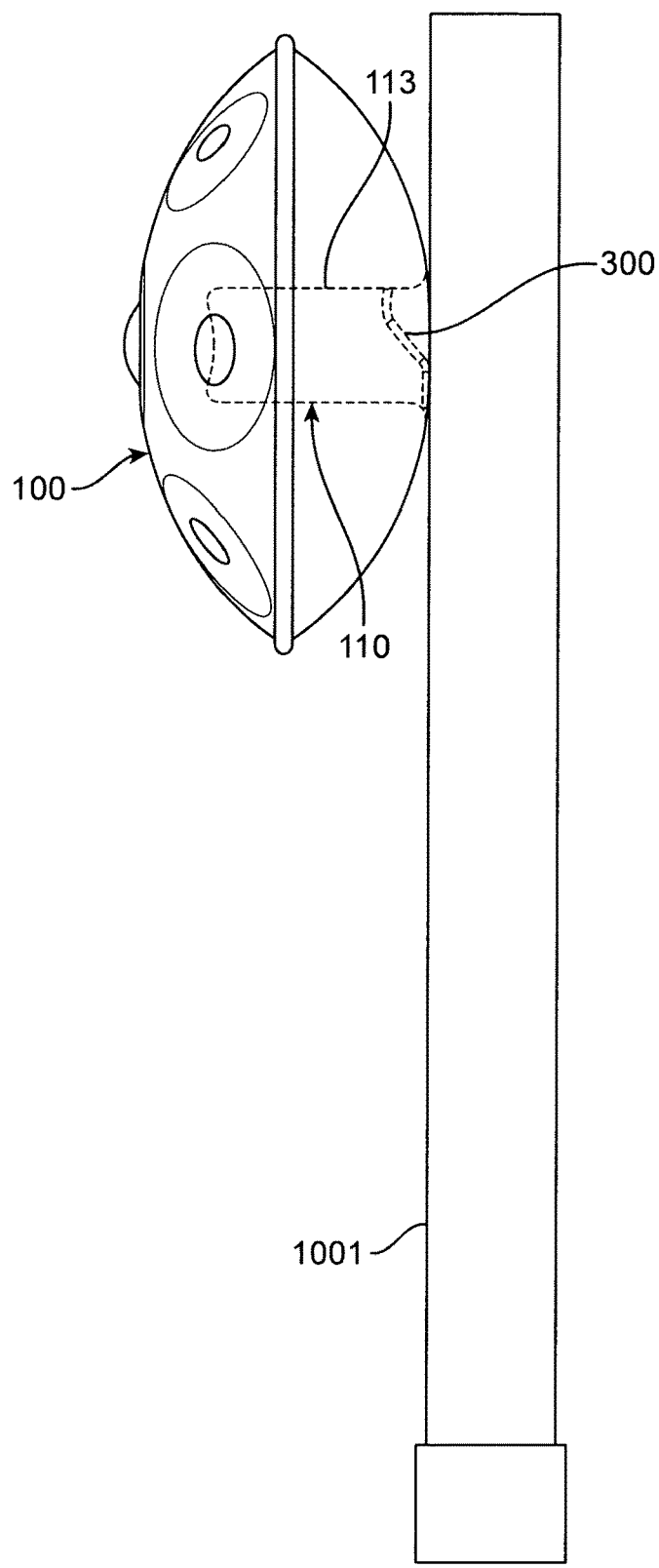
FIG. 5A may depict an exemplary embodiment of the hanger of the FIG. 3 series while the hanger (or a portion thereof) may be removably inserted into a cavity of the handpan and while the hanger may be mounted to the substrate, shown from a side view, with transparency to show a communicative relationship of the hanger with the cavity of the handpan.

FIG. 5A may depict the exemplary embodiment of hanger 300 while hanger 300 (or a portion thereof) may be removably inserted into cavity 110 of handpan 100 and while hanger 300 may be mounted to the substrate 1001, shown from a side view, with transparency to show the outline of cavity 110 and how hanger 300 may removably engage at least a portion of cavity 110.

In FIG. 5A, hanger 300 may be mounted to substrate 1001 and handpan-engagement-region 303 may be removably engaging the at least the portion of cavity 110 of handpan 100, such that handpan-plane 106 may be substantially parallel with the surface plane of the substrate, i.e., and an angle-off-from-parallel 207 between the handpan-plane 106 and the surface plane of the substrate may be about zero degrees. See e.g., FIG. 5A (and FIG. 2A).

In FIG. 5A, wherein the handpan-engagement-region 303 may engage the at least the portion of cavity 110 of handpan 100 by providing support structure for top cavity wall 113 of handpan 100 to rest by gravity upon some portion of handpan-engagement-region 303. For example, and without limiting the scope of the present invention, this some portion of handpan-engagement-region 303 may be terminal point 315.

Figure 5B:
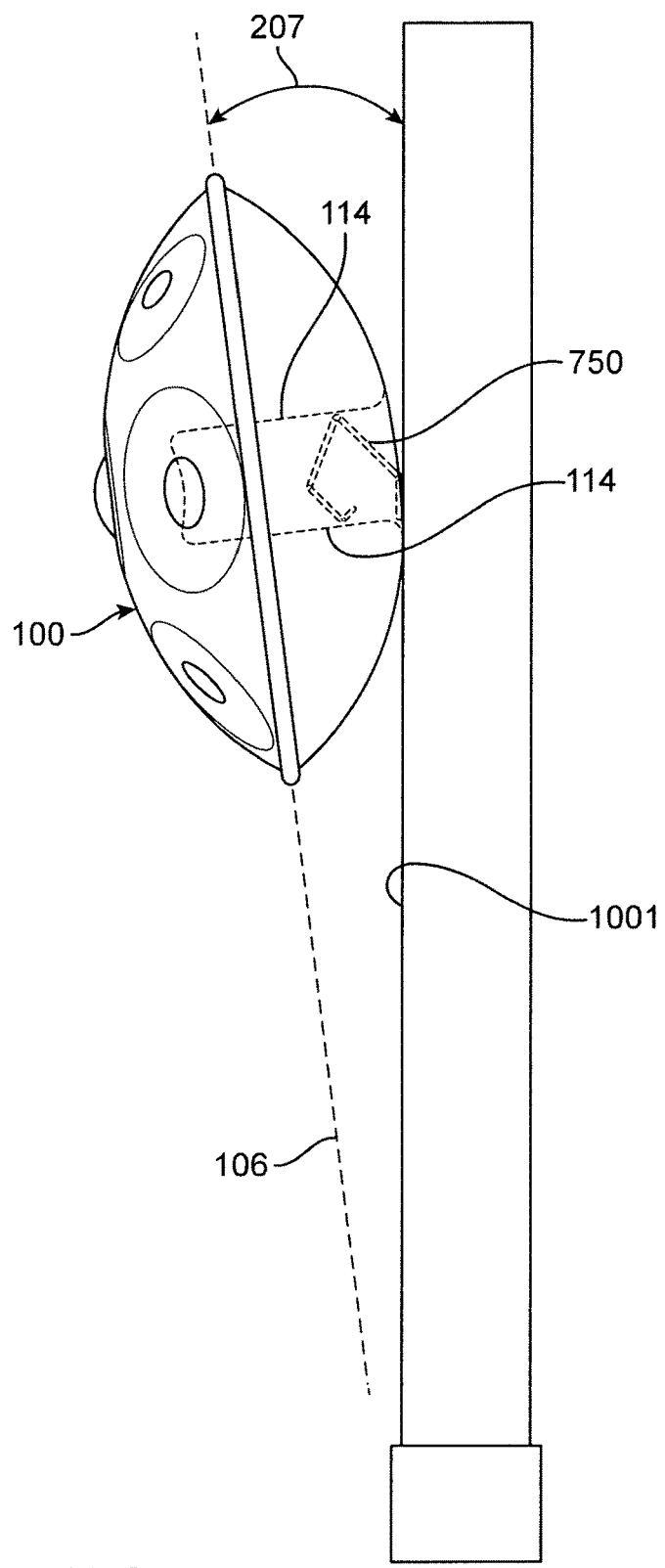
FIG. 5B may depict an embodiment of a different hanger while the different hanger (or a portion thereof) may be removably inserted into a cavity of the handpan and while the different hanger may be mounted to the substrate, shown from a side view, with transparency to show a communicative relationship of the different hanger with the cavity of the handpan.

FIG. 5B may depict handpan 100 removably mounted upon substrate 1001, where angle-off-from-parallel 207 may be greater than zero degrees, shown from a side view. The means for removable mounting hanger 750 to handpan 100 may be depicted in a partial transparent view showing the outline of cavity 110, to show how hanger 750 may removably engage at least a portion of cavity 110. (See FIG. 7B discussion below for discussion of hanger 750.)

Figure 5C:
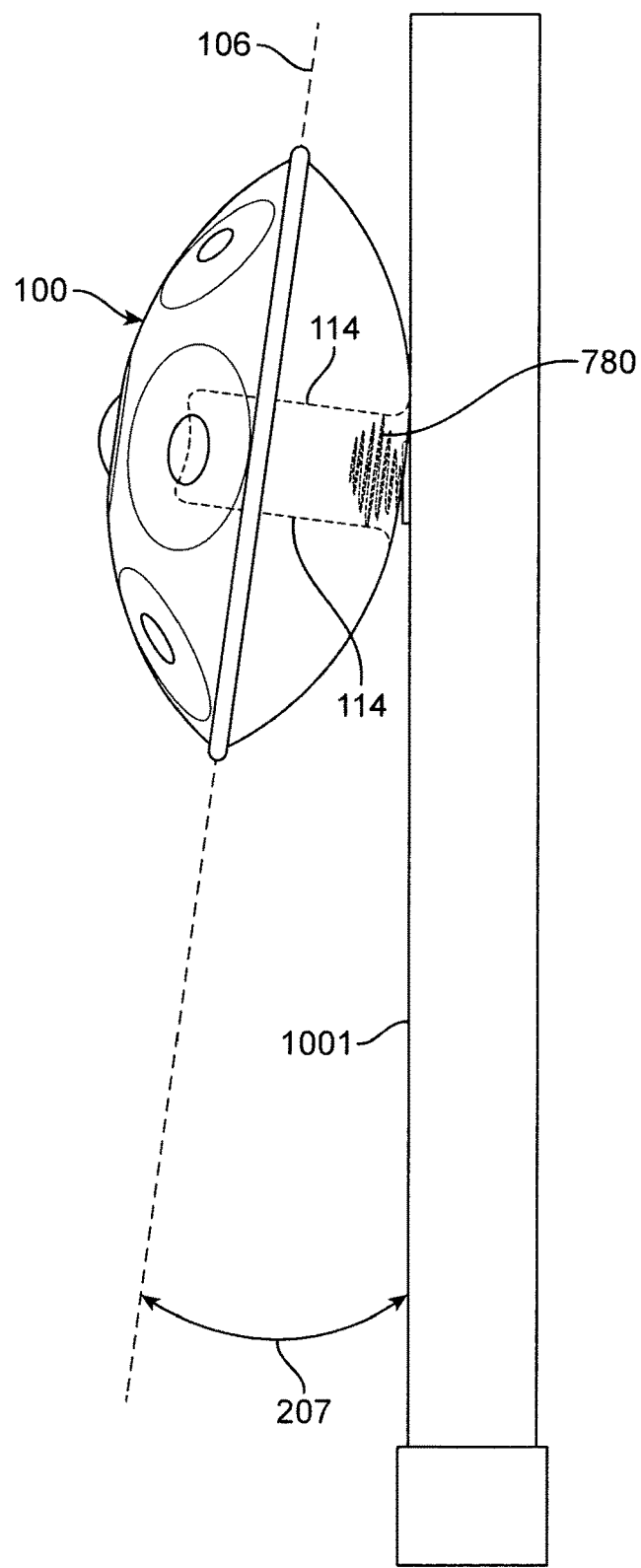
FIG. 5C may depict an embodiment of a further different hanger while the further different hanger (or a portion thereof) may be removably inserted into a cavity of the handpan and while the further different hanger may be mounted to the substrate, shown from a side view, with transparency to show a communicative relationship of the further different hanger with the cavity of the handpan.

Similarly, FIG. 5C may depict handpan 100 removably mounted upon substrate 1001, where angle-off-from-parallel 207 may also be greater than zero degrees, shown from a side view. The means for removable mounting hanger 780 to handpan 100 may be depicted in a partial transparent view showing the outline of cavity 110, to show how hanger 780 may removably engage at least a portion of cavity 110. (See FIG. 7C discussion below for discussion of hanger 780.)

FIG. 5B and FIG. 5C may differ from each other, in that a tilt of angle-off-from-parallel 207 may be opposite, i.e., in FIG. 5B, a top of handpan 100 may be tilted away from substrate 1001; whereas in FIG. 5C, a bottom of handpan 100 may be tilted away from substrate 1001—where top and bottom may be with respect to the floor (not depicted); wherein this floor may be substantially perpendicular to substrate 1001. Such a tilt of handpan 100 depicted in FIG. 5B and/or as depicted in FIG. 5C may be accomplished with either hanger 750 or hanger 780.

In some embodiments, hanger 750 or hanger 780 may permit angle-off-from-parallel 207 between handpan-plane 106 and the surface plane of the substrate to be up to about 12 degrees. See e.g., FIG. 5B and FIG. 5C (see also, FIG. 2C and FIG. 2D).

FIG. 6 may depict a side view of hanger 300, wherein at least a portion of hanger 300 may be substantially covered by covering 601. Also, in embodiments where covering 601 may cover the sides of hanger 300, in addition to covering upper substrate facing surface 313 and externally facing surface 314, FIG. 6 may depict a cross sectional side view of hanger 300, wherein at least a portion of hanger 300 may be substantially covered by covering 601.

In some embodiments, hanger 300 may be replaced with hanger 750 or hanger 780 in FIG. 6. In some embodiments, hanger 300 (hanger 750 or hanger 780) may comprise covering 601. In some embodiments, covering 601 may serve a protection function. Covering 601 may protect handpan 100 from impacts and scratches, such as, but not limited to, metal on metal scratches. Covering 601 may also protect at least one elongate member 301 from scratches and impacts. In some embodiments, covering 601 may protect a user from injury or undesirable physical contact with at least one elongate member 301. In some embodiments, covering 601 may serve an ornamental function, by adding different finishes, colors, and looks to hanger 300 (or to hanger 750 or to hanger 780).

In some embodiments, at least a portion of at least one elongate 301 may be substantially or completely covered by covering 601. In some embodiments, covering 601 may cover any portion of at least one elongate member 301 that may come into removable physical contact with cavity 110. In some embodiments, covering 601 may not cover substrate contacting surface 311. In some embodiments, covering 601 may not cover sides of at least one elongate member 301.

In some embodiments, covering 601 may be selected from one or more of the following: a foam, an elastomer, a rubber (natural and/or synthetic), a plastic, an enamel, a paint, a powder coating, combinations thereof, and/or the like. For example, and without limiting the scope of the present invention, covering 601 may be applied as a dip and/or as an extruded material slipped over at least the portion of at least one elongate member, wherein subsequent heat shrinking may be used in some embodiments. For example, and without limiting the scope of the present invention, covering 601 may be a vinyl covering and/or vinyl coating. For example, and without limiting the scope of the present invention, covering 601 may be a plastisol coating.

Note, including of covering 601 to a given hanger embodiment, increases the effective thickness of that hanger. For example, and without limiting the scope of the present invention, with some embodiments of covering 601 applied to hanger 300, an effective dimension of thickness 309 may be about in a range of about 0.79 cm to about 1.30 cm. For example, and without limiting the scope of the present invention, with some embodiments of covering 601 applied to hanger 300, an effective dimension of transverse-width 308 may be about 3.22 cm.

A FIG. 7 series of figures may depict three figures of additional embodiments of hangers. Each FIG. 7 figure may depict a different hanger embodiment.

Figure 7A:
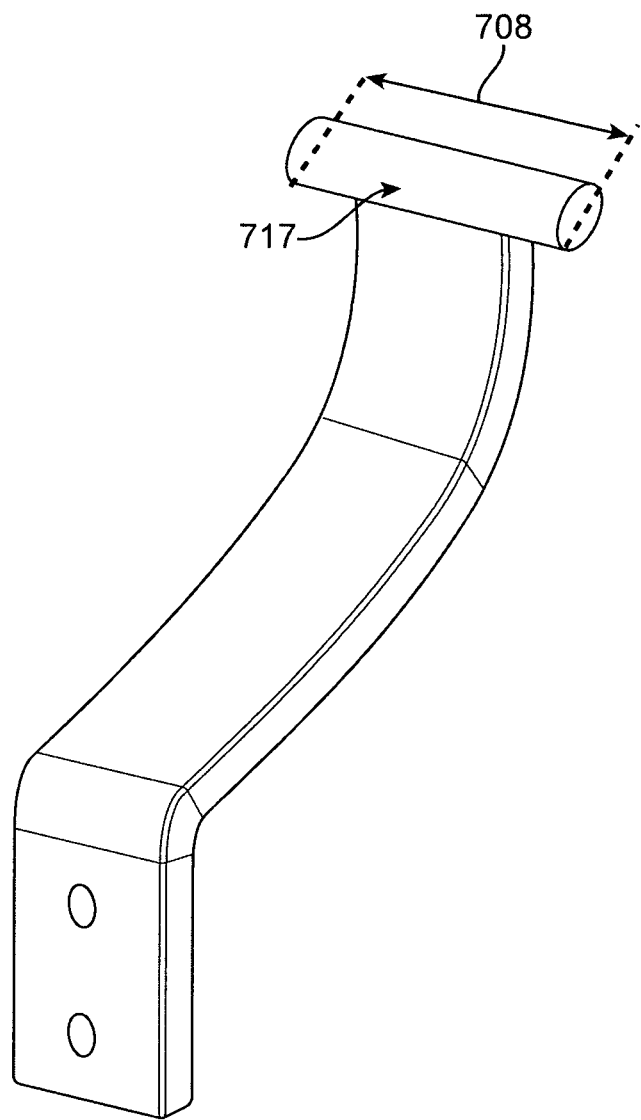
FIG. 7A may depict a perspective view of another hanger, wherein the another hanger may comprise a cylindrical head structure.

FIG. 7A may depict a perspective view of a modified hanger 300, wherein modified hanger 300 may comprise a cylindrical head structure 717, comprising transverse-width 708. That is, terminal point 315 may terminate in cylindrical head structure 717. In some embodiments, handpan-engagement-region (e.g., 303) may comprise a dimension greater than transverse-width 308 of the flat rod portion of hypotenuse-region 306, wherein this greater dimension is the transverse width of cylindrical head structure 717, which is denoted as transverse-width 708. In some embodiments, transverse-width 708 of handpan-engagement-region 303 may be less than cavity diameter 111, so that the handpan-engagement-region 303 may fit removably within cavity 110. Some handpan 100 cavities 110 may range in cavity diameter 111 of about 7 cm to about 9 cm. In some embodiments, transverse-width 708 may be about the same as cavity diameter 111, in embodiments wherein handpan-engagement-region 303 removably engages cavity 110 by friction and not just by gravity.

In some embodiments, handpan-engagement-region (e.g., 303) may comprises a three dimensional shape. The three dimensional shape may be selected from the group comprising: regular polygons, irregular polygons, ovoids, cylinders, spheres, cones, combinations thereof, and/or the like. Herein, polygons may comprise: rectangular prisms, cubes, triangular prisms, square pyramids, triangular pyramids, and the like.

Figure 7B:
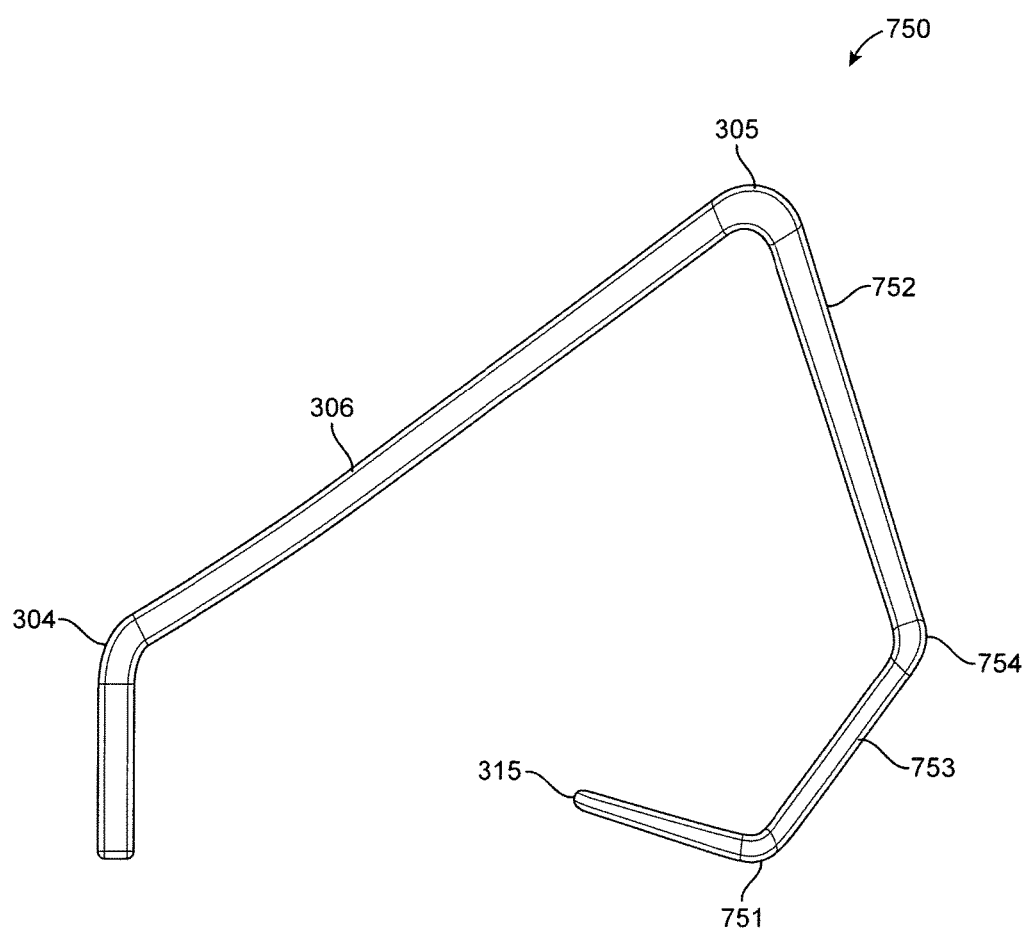
FIG. 7B may depict a side view of the different hanger (also shown in FIG. 5B), wherein this different hanger may be structured to removably grip the cavity of the handpan by a frictional gripping means (e.g., via spring tension).

FIG. 7B may depict a side view of hanger 750, wherein hanger 750 may be structured to removably grip cavity 110 of handpan 100 by a frictional gripping means (e.g., via spring tension). Operation of hanger 750 may be depicted in FIG. 5B.

In some embodiments, handpan-engagement-region 303 may be sized to removably engage cavity 110 by friction against at least two opposing cavity side walls 114 of cavity 110 of handpan 100. See e.g., FIG. 5B. In some embodiments, the at least one elongate member may be sized and structured to provide spring tension for removable frictional engagement against at least two opposing cavity side walls 114 of cavity 110 of handpan 100. See e.g., FIG. 5B.

Continuing discussing FIG. 7B, in some embodiments, handpan-engagement-region 303 may comprise second-bend 305, a span, a third-bend 751, and terminal-end 315—in integral contact as a single article of manufacture. In some embodiments, second-bend 305 may link hypotenuse-region 306 to the span. In some embodiments, third-bend 751 may link the span to terminal-end 315. In some embodiments, terminal-end 315 may be a most distal portion of hanger 750 from the substrate-mounting-region 302 by way of traversing the at least one elongate member. Angles of second-bend 305 and third-bend 751 and a length of the span may be sized such that second-bend 305 and third-bend 751 physically contact opposing cavity sides walls 114 of handpan 100 cavity 110 when handpan-engagement-region 303 may be removably inserted into at least some portion of cavity 110, such that cavity 110 may be removably frictionally held to handpan-engagement-region 303.

In some embodiments, first-bend 304, second-bend 305, and third-bend 751 may angle in a way to form a spiral shape of the at least one elongate member. See e.g., FIG. 7B.

In some embodiments (e.g., as depicted in FIG. 7B), the span may be sub-divided into a first-span 752 and a second-span 753. In some embodiments, first-span 752 may be separated from second-span 753 by a fourth-bend 754. In some embodiments, fourth-bend 754 may link first-span 752 to second-span 753. In some embodiments, fourth-bend 754 may be disposed between second-bend 305 and third-bend 751. In some embodiments, first-bend 304, second-bend 305, third-bend 751, and fourth-bend 754 may angle in a way to form the spiral shape of the at least one elongate member. See e.g., FIG. 7B.

Figure 7C:
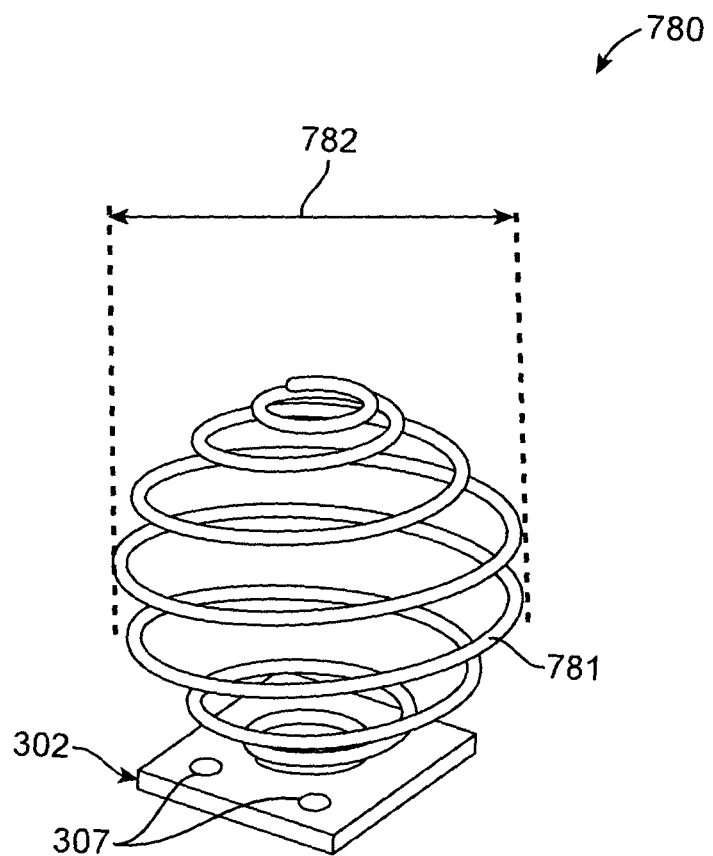
FIG. 7C may depict a perspective view of the further different hanger (also shown in FIG. 5C), wherein this further different hanger may be structured to removably grip the cavity of the handpan by a frictional gripping means (e.g., via spring tension).

FIG. 7C may depict a perspective view of hanger 780, wherein hanger 780 may be structured to removably grip cavity 110 of handpan 100 by a frictional gripping means (e.g., via spring tension). Operation of hanger 780 may be depicted in FIG. 5C.

In some embodiments, the handpan-engagement-region may comprise a radial spiral 781 emanating from substrate-mounting-region 302. In some embodiments, at least one elongate member 301 may be radial spiral 781. In some embodiments, radial spiral 781 may comprise at least one outside diameter 782. In some embodiments, at least one outside diameter 782 may be sized to be substantially the same or less than cavity diameter 111, such that when the handpan-engagement-region may be inserted into at least a portion of cavity 110, at least one outside diameter 782 may physically contact at least two points of opposing cavity side walls 114 of handpan 110, such that cavity may be removably frictionally held to the handpan-engagement-region. See e.g., FIG. 5C.

In some embodiments, the radial spiral 781 may approximate a three dimensional ovoid, sphere, disk, cone shape, or other similar shape. See e.g., FIG. 7C and FIG. 5C.

In some embodiments, the at least one elongate member (e.g., 301) may be substantially constructed of one or more of: a metal, a thermoformed plastic, a ceramic, a glass, a wood, a stone, a granite, a composite, a laminate, combinations thereof, and/or the like.

In some embodiments, the metal may be selected from one or more of the following steel, stainless steel, aluminum, copper, brass, tin, combinations thereof, and/or the like.

In some embodiments, the at least one elongate member (e.g., 301) may be able to withstand (without any deformation affecting performance) a static load of 250 pounds (lbs.) or less.

In some embodiments, the at least one elongate member (e.g., 301) may be substantially constructed of one or more thermoplastics suitable for injection molding. For example, and without limiting the scope of the present invention, various exemplary embodiments of at least one elongate member 301 may be substantially constructed of one or more materials of acrylic, acrylonitrile-butadiene styrene (ABS), polyvinyl chloride (PVC), polycarbonate, nylon, polypropylene, polyethylene (e.g., HDPE), combinations thereof, and/or the like. Such thermoplastics may comprise fillers for additional structural strength such as glass fibers and/or the like. Such thermoplastics may comprise additional ribbing structures to add additional structural support.

Note with respect to the materials of construction, it is not desired nor intended to thereby unnecessarily limit the present invention by reason of such restricted disclosure.

A FIG. 8 series of figures and a FIG. 9 series of figures may each depict two different embodiments of "landing strip" structures, for use with various hanger embodiments (e.g., 300, 750, and/or 780). In some embodiments, these landing strips may be accessories to the hangers (e.g., 300, 750, and/or 780). In some embodiments, the hangers (e.g., 300, 750, and/or 780) may comprise such landing strips. In some embodiments, a system may comprise various hangers (e.g., 300, 750, and/or 780) and landing strip embodiments. In some embodiments, a method for removably mounting handpan 100 in proximity to substrate 1001 may comprise use of various hanger embodiments (e.g., 300, 750, and/or 780), and various landing strip embodiments.

In some embodiments, when the substrate-mounting-region 302 may be mounted to substrate 1001 and handpan-engagement-region 303 may be removably engaging handpan 100, at least a portion of the landing strip may be disposed between handpan 100 and substrate 1001, such that the substrate 1001 may be protected from handpan 100 and/or handpan 100 may be protected from substrate 1001. That is, the landing strip may function as a cushion, a divider, and/or as a separator. In some embodiments, the landing strip may be substantially constructed of one or more of an elastomer, a metal, a thermoformed plastic, a ceramic, a glass, a wood, a composite, a laminate, combinations thereof, and/or the like. In some embodiments, the landing strip may be substantially transparent. In some embodiments, the landing strip may be substantially acrylic.

In some embodiments, the landing strip may be may be mounted to substrate 1001 when substrate-mounting-region 302 may be directly attached (mounted) to substrate 1001, with no landing strip material disposed between, see e.g., the FIG. 8 series of figures.

In some embodiments, the landing strip may comprise a mounting means integral to the landing strip, such as, and without limitation, an adhesive, and/or a VELCRO type of system; wherein this mounting means is for mounting the landing strip to substrate 1001. Such an adhesive may be removable.

In some embodiments, the landing strip may be mounted to substrate 1001. In some embodiments, the landing strip may be removably mounted to substrate 1001. In some embodiments, the landing strip may be may be mounted to substrate 1001 by having at least a portion of the landing strip being disposed between substrate 1001 and substrate-mounting-region 302 when the substrate-mounting-region 302 may be attached coupled to substrate 1001 through a portion of the landing strip. See e.g., the FIG. 9 series of figures.

In some embodiments, the landing strip may comprise a substantially planar shape, i.e., the landing strip may substantially be a planar member. In some embodiments, the landing strip may be substantially rigid to substantially semi-rigid. When in use, one major surface of the landing strip may be substantial physical contact with substrate 1001, such that surfaces of contact may be substantially parallel. In some embodiments, the landing strip may comprise a disk shape. The disk shape may comprise a disk-outside-diameter. See e.g., the FIG. 8 and the FIG. 9 series of figures. In some embodiments, the disk-outside-diameter may be less than total outside diameter 120 of handpan 100. Some handpans 100, for example, may have total outside diameter 120 of about 52 cm.

Figure 8A:
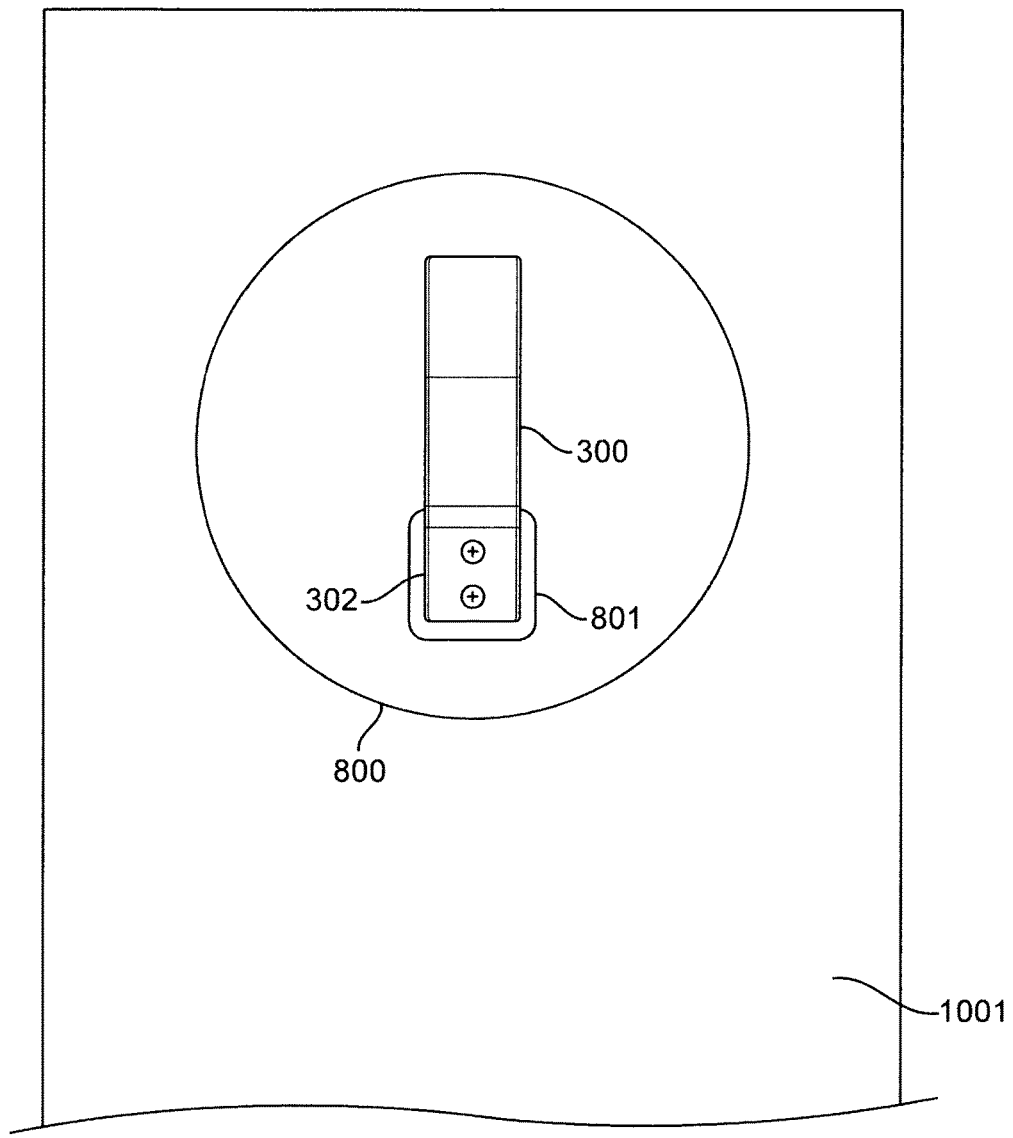
FIG. 8A may depict a landing strip in use with the hanger, wherein both the landing strip and the hanger may be mounted to the substrate, shown from a front view.
Figure 8B:
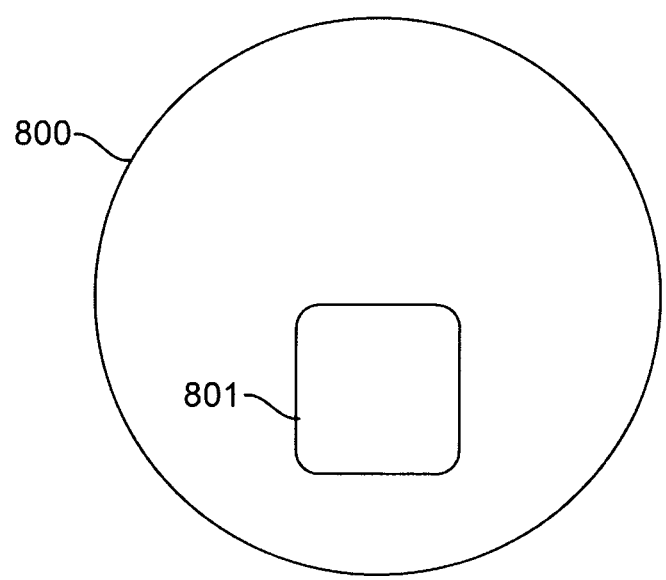
FIG. 8B may depict the landing of FIG. 8A, but without the hanger and without the substrate depicted, shown from the same front view.
Figure 8C:
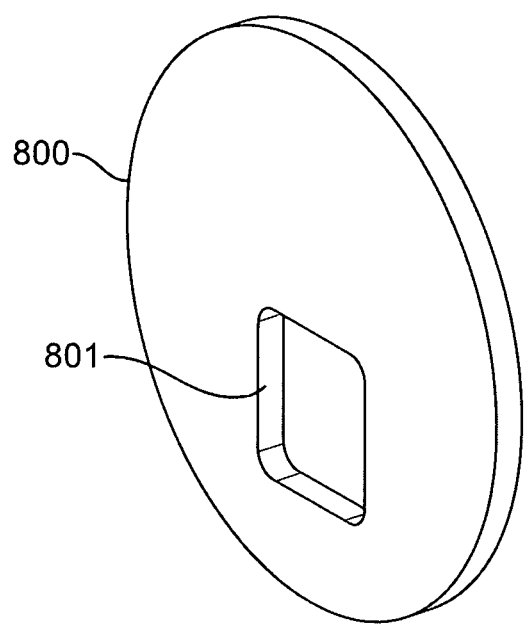
FIG. 8C may depict the landing of FIG. 8A, but without the hanger and without the substrate depicted, shown from a perspective view.
Figure 8D:
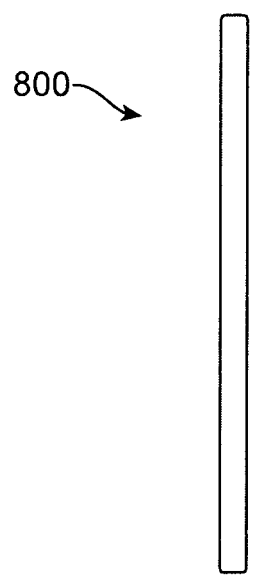
FIG. 8D may depict the landing of FIG. 8A, but without the hanger and without the substrate depicted, shown from a side view (left or right) (or from a top or a bottom view).

FIG. 8A may depict a landing strip 800 in use with hanger 300, wherein both landing strip 800 and hanger 300 may be mounted to substrate 1001, shown from a front view. FIG. 8B may depict landing strip 800, shown from the same front view. FIG. 8C may depict landing strip 800, shown from a perspective view. FIG. 8D may depict landing strip 800, shown from a side view (left or right) (and this side view may be a same view as a top view or a bottom view due to a radial symmetry of the disc shape of landing strip 800). FIGS. 8B, 8C, and 8D may not depict hanger 300 nor substrate 1001.

In some embodiments, landing strip 800 may comprise the disk shape. In some embodiments, the disk shape may comprise a cutout 801 sized such that handpan-engagement-region 303 and substrate-mounting-region 302 may be insertable through cutout 801, such that substrate-mounting-region 302 may physically and directly contacting substrate 1001.

In some embodiments, landing strip 800 may be mounted to substrate 1001 when substrate-mounting-region 302 may be directly attached (mounted) to substrate 1001, with no landing strip 800 material disposed between substrate-mounting-region 302 and substrate 1001. In some embodiments, landing strip 800 may comprise a mounting means integral to landing strip 800, such as, and without limitation, an adhesive, and/or a VELCRO type of system; wherein this mounting means may be for mounting landing strip 800 to substrate 1001. Such an adhesive may be removable in some embodiments.

Figure 9A:
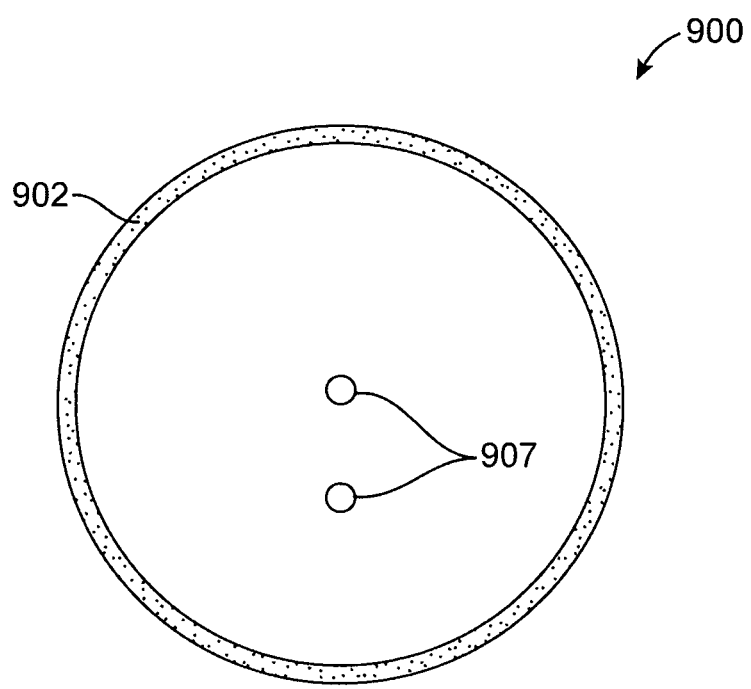
FIG. 9A may depict another embodiment of a different landing strip, shown from a front view.
Figure 9B:
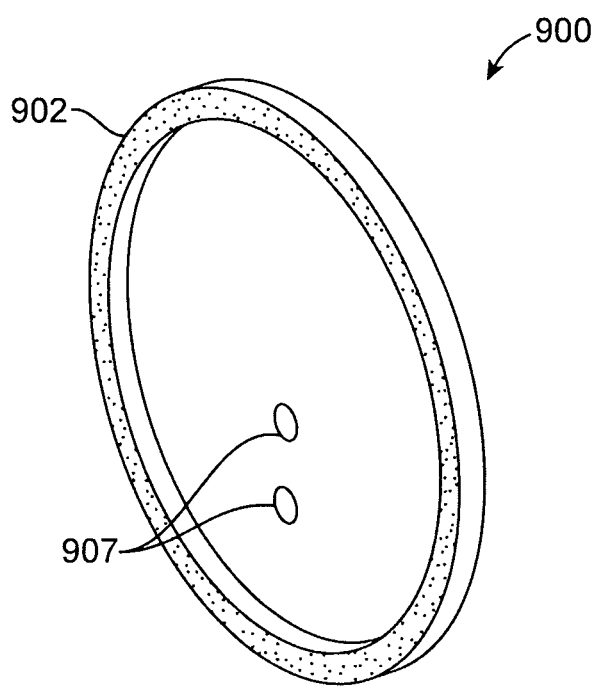
FIG. 9B may depict the landing strip of FIG. 9A, shown from a front perspective view.
Figure 9C:
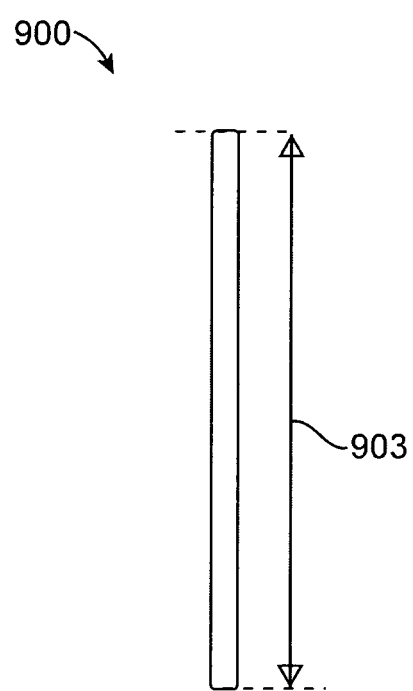
FIG. 9C may depict the landing strip of FIG. 9A, shown from a side view (left or right) (or from a top or a bottom view).

FIG. 9A may depict an embodiment of a landing strip 900, shown from a front view. FIG. 9B may depict landing strip 900, shown from a front perspective view. FIG. 9C may depict landing strip 900, shown from a side view (left or right) (and this side view may be a same view as a top view or a bottom view due to a radial symmetry of the disc shape of landing strip 900). Landing strip 900 may differ from landing strip 800, in that landing strip 900 may not comprise a cutout, such as cutout 801.

Discussing FIG. 9A, in some embodiments, landing strip 900 may comprise the disk shape. In some embodiments, the disk shape may comprise a same number of mounting holes 907 as there are holes 307 present in substrate-mounting-region 302; such that when substrate-mounting-region 302 may be mounted to substrate 1001, landing strip 900 may be disposed between substrate-mounting-region 302 and substrate 1001, with holes 307 lining up and being collinear with holes 907. In some embodiments, the same number of mounting holes 907 in the disk shape may be concentric with mounting holes 307 of substrate-mounting-region 302.

In some embodiments, the disk shape may comprise a raised edge 902 (see FIGS. 9A and 9B) running along a periphery of disk-outside-diameter 903 (see FIG. 9C for substrate-mounting-region 302). In some embodiments, raised edge 902 may be a same material as compared to a balance of landing strip 900 or landing strip 800. In some embodiments, raised edge 902 may be a different material as compared to the balance of landing strip 900 or landing strip 800. In some embodiments, raised edge 902 may be substantially constructed from one or more of a foam, an elastomer, a rubber (natural and/or synthetic), a plastic, an enamel, a paint, a powder coating, combinations thereof, and/or the like. Raised edge 902 may function as a coping or a bumper. Note, in some embodiments, raised edge 902 may be a structural component in landing strip 900. In some embodiments, raised edge 902 may be integral with a balance of landing strip 900. In some embodiments, raised edge 902 may be a annular ring part that is separate and attachable to the disc shape of landing strip 900.

As noted, in some embodiments, landing strip 800 and/or 900 may function as a cushion, a separator, and/or a divider. In some embodiments, landing strip 800 and/or landing strip 900 may be substantially constructed of one or more of an elastomer (e.g., rubber, silicone, and the like), a metal, a thermoformed plastic, a ceramic, a glass, a wood, a composite, a fabric, a textile, a cloth, a laminate, combinations thereof, and/or the like. In some embodiments, raised edge 902 may be substantially constructed of one or more of an elastomer (e.g. rubber, silicone, and the like), a metal, a thermoformed plastic, a ceramic, a glass, a wood, a composite, a laminate, a fabric, a textile, a cloth, combinations thereof, and/or the like.

In some embodiments, a method for removably mounting handpan 100 in proximity to a substrate 1001 may be disclosed, described, and/or claimed. In some embodiments, the method may, comprise the steps of:

Step (a): mounting a hanger (e.g., 300, 750, and/or 780) to substrate 1001. As noted, such hangers may comprise at least one elongate member 301, wherein at least one elongate member 301 may comprise: substrate-mounting-region 302 disposed from handpan-engagement-region 303. As noted, in some embodiments, substrate-mounting-region 302 may be structurally configured to mount to substrate 1001 so that the hanger may be mounted to substrate 1001. As noted, in some embodiments, handpan-engagement-region 303 may be structurally configured to engage the at least some portion of cavity 110 of handpan 100.

Step (b): inserting all or a portion of handpan-engagement-region 303 into cavity 110, such that handpan-engagement-region 303 may removably support (and/or frictionally engage) handpan 100 so handpan 100 may be removably mounted in proximity to substrate 1001.

In some embodiments, the method may further comprise a step of using a landing strip embodiment (e.g., 800 or 900), such that at least a portion of the landing strip may be disposed between a portion of handpan 100 and a portion of substrate 1001.

In some methods of using landing strip 900 with the hanger, landing strip 900 may be placed against substrate 1001; then substrate-mounting-region 302 may be placed against landing strip 900, such that holes 907 and holes 307 align, then screws or the like may be inserted into the aligned holes to thus mount the hanger to substrate 1001, with some portion of landing strip 900 disposed between substrate-mounting-region 302 and substrate 1001; and then cavity 110 may be inserted onto handpan-engagement-region 303, such that the hanger now removably has mounted handpan 100 to substrate 1001. Receiving holes in substrate 1001 may need to be drilled and/or bored prior to such receiving holes receiving the screws or the like.

Note, as used herein, the phrase, "substrate-mounting-region is mounted to the substrate" or the like, may mean substrate-mounting-region 302 may be directly mounted to and in physical contact with substrate 1001; or that substrate-mounting-region 302 may be directly in physical contact with a portion of a landing strip (e.g., landing strip 900); such that this portion of the landing strip may be disposed between substrate-mounting-region 302 and substrate 1001; but that screws or the like passing through holes 907 and 307 may be received into receiving holes in substrate 1001. That is, it is expressly contemplated that concepts of mounting substrate-mounting-region 302 to substrate 1001, may in some embodiments, include portions of the landing strip disposed between substrate-mounting-region 302 and substrate 1001.

Note, as used herein, the word, "about," particularly when used to refer to measurements and/or dimensions may mean to include a tolerance of plus or minus 10% of the applicable measurement and/or units noted.

Embodiments of handpan hangers have been described, including systems comprising a hanger and a landing strip, as well as methods of using the hangers and/or the landing strips. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A hanger for removably coupling a handpan musical instrument to a substantially vertical wall with a substantially planar surface, wherein the musical instrument is a handpan, the hanger comprising at least one elongate member, wherein the at least one elongate member comprises: a substrate-mounting-region, wherein the substrate-mounting-region is attachable to the substantially vertical wall so that the hanger is mounted to the substantially vertical wall, wherein mounted is more than the substrate-mounting-region merely resting against the substantially vertical wall; a handpan-engagement-region, wherein the handpan-engagement-region removably engages at least some portion of a bass cavity of the handpan; a hypotenuse-region, wherein the hypotenuse-region is disposed between the substrate-mounting-region and the handpan-engagement-region; wherein the hypotenuse-region is substantially linear; a first-bend, wherein the first-bend is disposed between the substrate-mounting-region and the hypotenuse-region, wherein the first-bend links the substrate-mounting-region to the hypotenuse-region; wherein the first-bend bends away from the substantially vertical wall when the substrate-mounting-region is mounted to the substantially vertical wall; a second-bend, wherein the second-bend is disposed between the hypotenuse-region and the handpan-engagement-region, wherein the second-bend links the hypotenuse-region to the handpan-engagement-region; wherein there are no other bends between the first-bend and the second-bend; wherein the at least one elongate member begins with the substrate-mounting-region and ends with the handpan-engagement-region; wherein the at least one elongate member is substantially rigid; wherein when the hanger is mounted to the substantially vertical wall, the handpan-engagement-region removably supports the handpan so the handpan is mounted in proximity to the substantially vertical wall; wherein when the hanger is mounted to the substantially vertical wall, a critical angle is formed between the substantially vertical wall and the hypotenuse-region; wherein this critical angle is in a range of about 50 degrees to about 70 degrees.

2. The hanger according to claim 1, wherein the substrate-mounting-region comprises a substrate-attachment that is part of the substrate-mounting-region, wherein the substrate-attachment provides structure to mount the substrate-mounting-region to the substantially vertical wall.

3. The hanger according to claim 1, wherein the second-bend bends towards the substantially vertical wall when the substrate-mounting-region is mounted to the substantially vertical wall.

4. The hanger according to claim 1, wherein the at least one elongate member comprises an upper substrate facing surface and an externally facing surface disposed opposite of the substrate facing surface, wherein the upper substrate facing surface substantially faces the substantially vertical wall when the substrate-mounting-region is mounted to the substantially vertical wall and does not face away from the substantially vertical wall.

5. The hanger according to claim 4, wherein the at least one elongate member comprises a transverse-width and a thickness, wherein the transverse-width is larger than the thickness and wherein the transverse-width is substantially perpendicular to the thickness; wherein the thickness runs from the upper substrate facing surface to the externally facing surface.

6. The hanger according to claim 1, wherein when the hanger is mounted to the substantially vertical wall, the at least one elongate member comprises a minimal length, such that a terminal point of the handpan-engagement-region is at least 5 centimeters from the substantially vertical wall, wherein this distance is an orthogonal distance from the substantially vertical wall to the terminal point of the handpan-engagement-region, wherein this distance is important for the handpan-engagement-region to removably engage the at least some portion of the bass cavity of the handpan.

7. The hanger according to claim 1, wherein the handpan-engagement-region comprises a three dimensional shape, wherein the three dimensional shape is selected from one or more of regular polygons, irregular polygons, ovoids, cylinders, spheres, or cones.

8. The hanger according to claim 1, wherein the handpan-engagement-region is sized to removably engage the bass cavity of the handpan by friction against at least two opposing bass cavity side walls of the handpan.

9. The hanger according to claim 1, wherein the at least one elongate member is sized and structured to provide spring tension for removable frictional engagement against at least two opposing cavity side walls of the handpan.

10. The hanger according to claim 1, wherein the handpan-engagement-region comprises: a span, a third-bend, and a terminal-end; wherein the second-bend links the hypotenuse-region to the span, wherein the third-bend links the span to the terminal-end; wherein the terminal-end is the most distal portion of the hanger from the substrate-mounting-region; wherein angles of the second-bend and the third-bend and a length of the span are sized such that the second-bend and the third-bend physically contact opposing cavity sides walls of the handpan when the handpan-engagement-region is removably inserted into at least some portion of the cavity, such that the cavity is removably frictionally held to the handpan-engagement-region.

11. The hanger according to claim 10, wherein the first-bend, the second-bend, and the third-bend angle to form a spiral shape of the at least one elongate member.

12. The hanger according to claim 10, wherein the span is sub-divided into a first-span and a second-span, wherein the first-span is separated from the second-span by a fourth-bend, wherein the fourth-bend links the first-span to the second-span; wherein the fourth-bend is disposed between the second-bend and the third-bend.

13. The hanger according to claim 12, wherein the first-bend, the second-bend, the third-bend, and the fourth-bend angle to form a spiral shape of the at least one elongate member.

14. The hanger according to claim 1, wherein the at least one elongate member is substantially constructed of one or more of a metal, a thermoformed plastic, a ceramic, a glass, a wood, a stone, a granite, a composite, a laminate, or combinations thereof.

15. The hanger according to claim 1, wherein at least a portion of the at least one elongate member is substantially covered by a covering.

16. The hanger according to claim 15, wherein the covering is selected from one or more of a foam, an elastomer, a rubber, a plastic, an enamel, a paint, a powder coating, or combinations thereof.

* * * * *